Sept. 27, 1966 J. R. THOMAS 3,275,114
CONSTANT SPEED CONTROL MEANS FOR VARIABLE POWER
TRANSMITTING HYDRAULIC APPARATUS
Filed Aug. 17, 1964 7 Sheets-Sheet 4
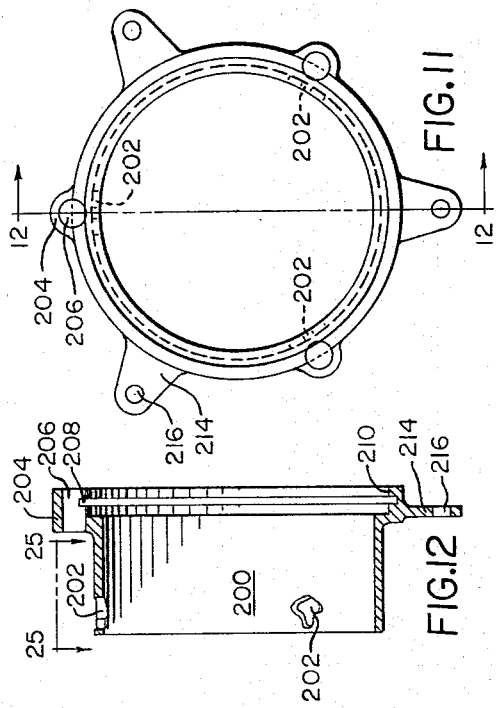
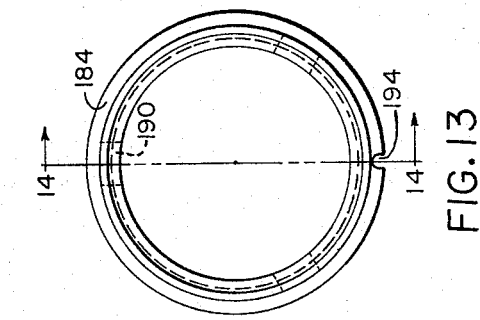
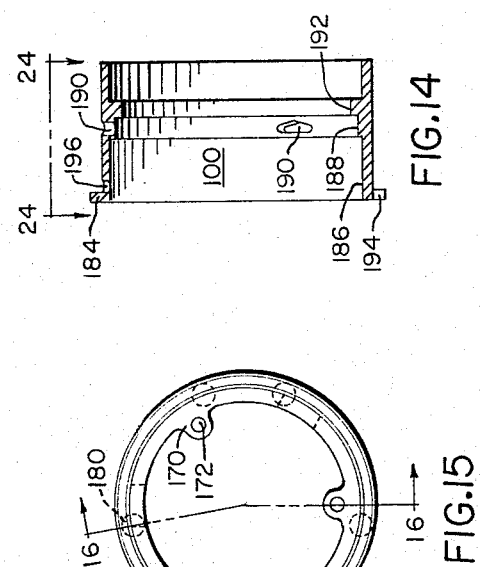
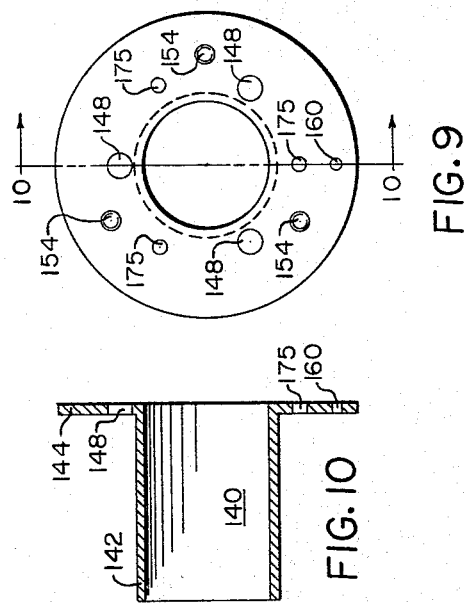
INVENTOR.
JOHN R. THOMAS
BY

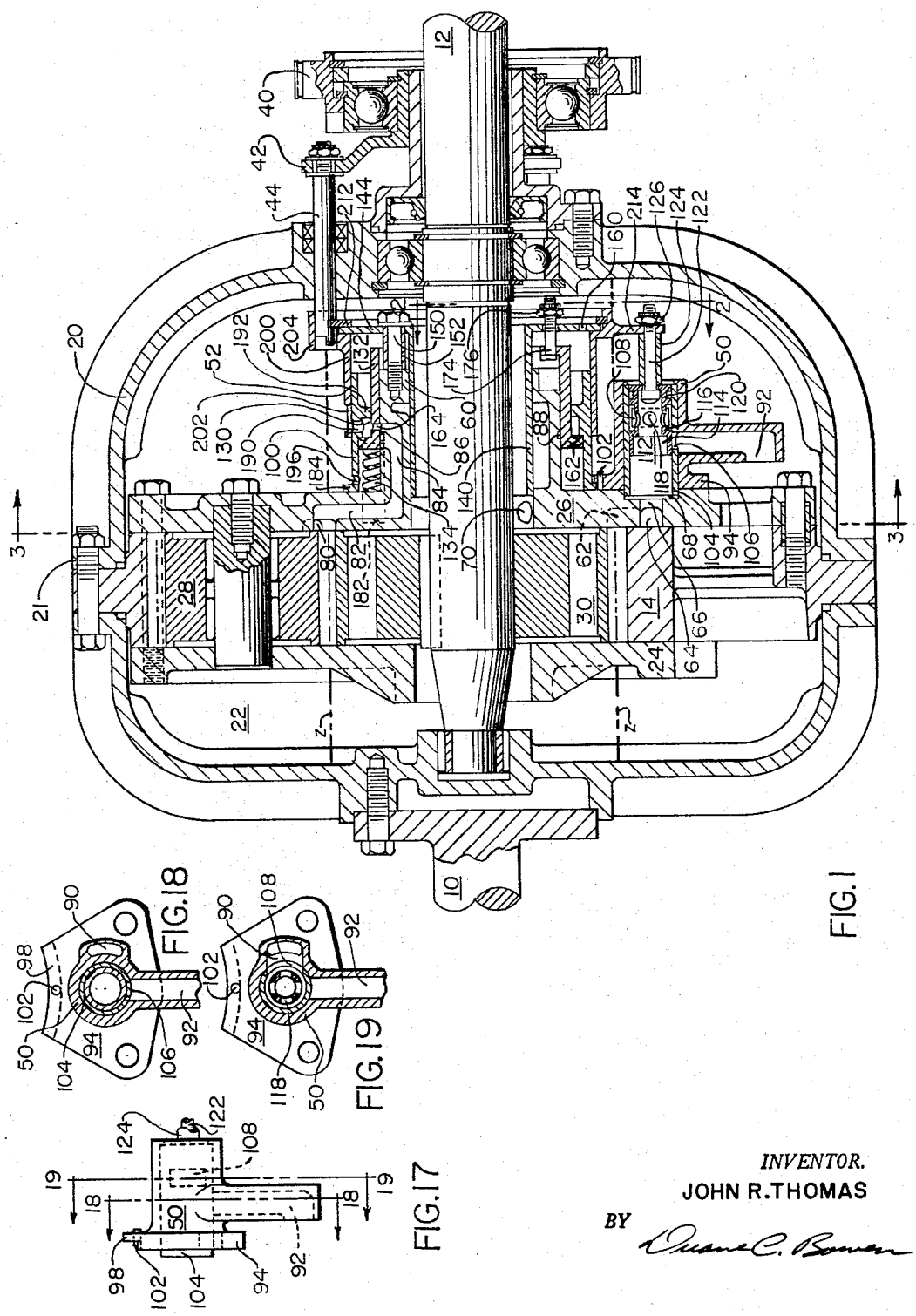

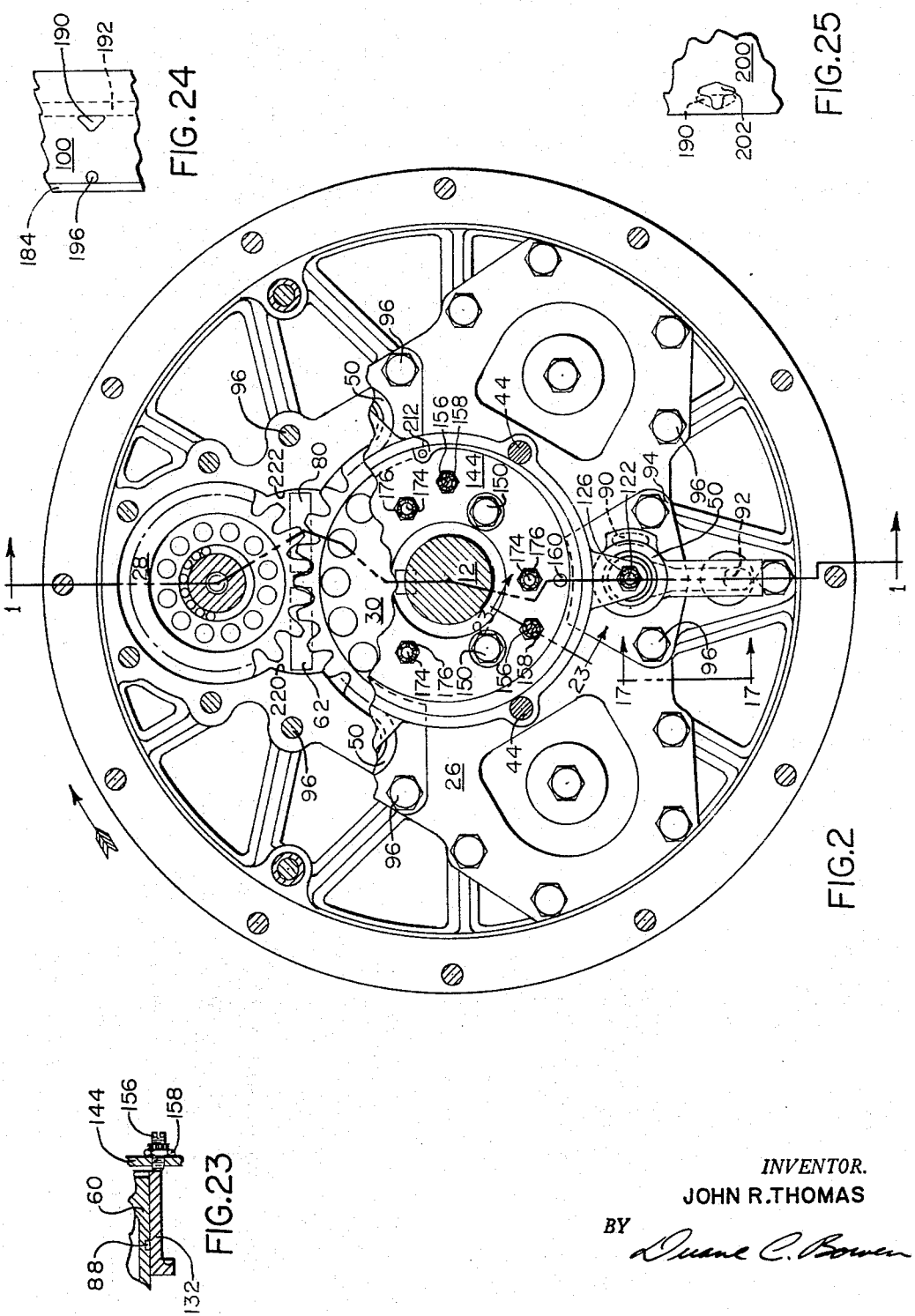

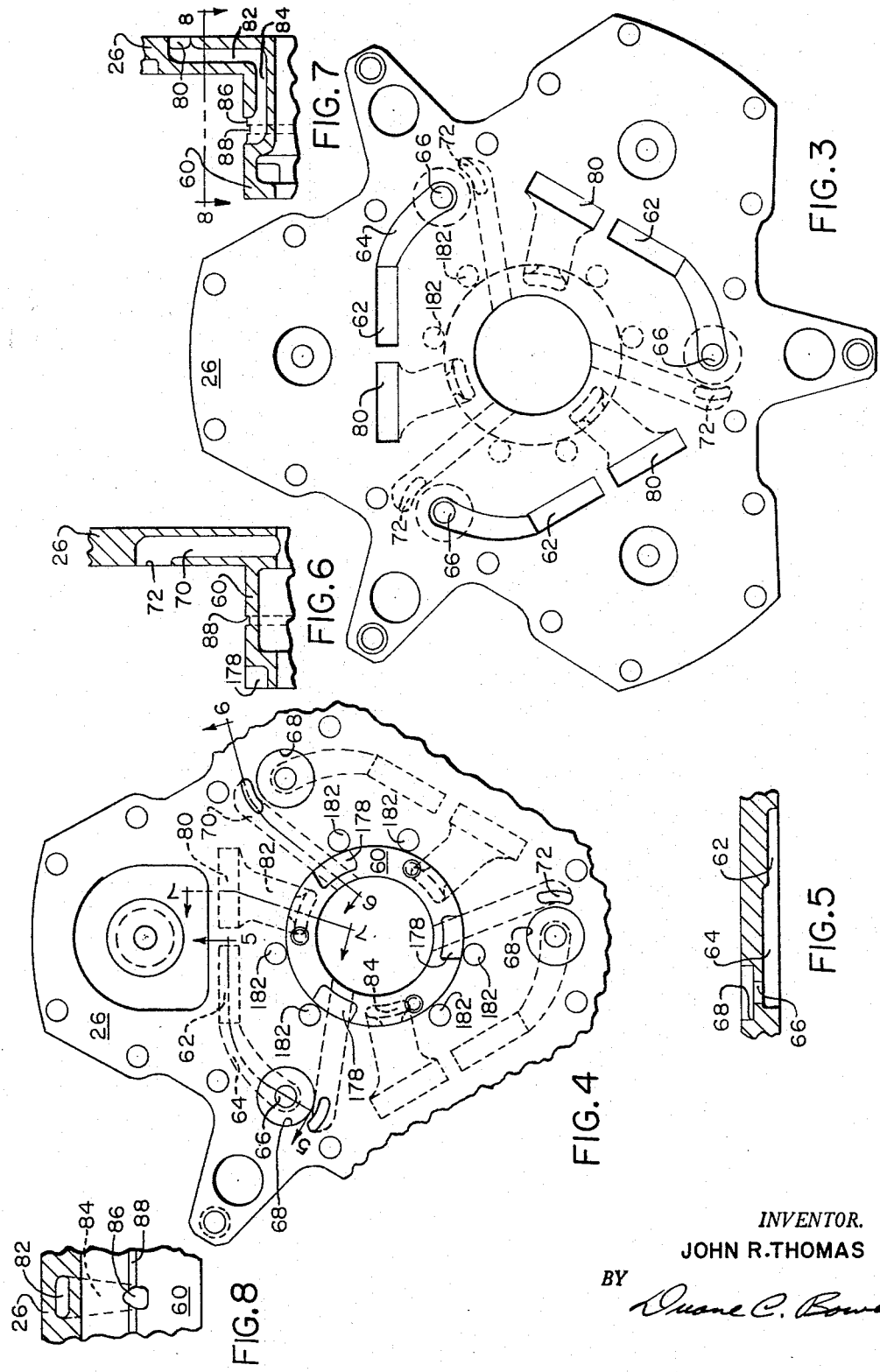

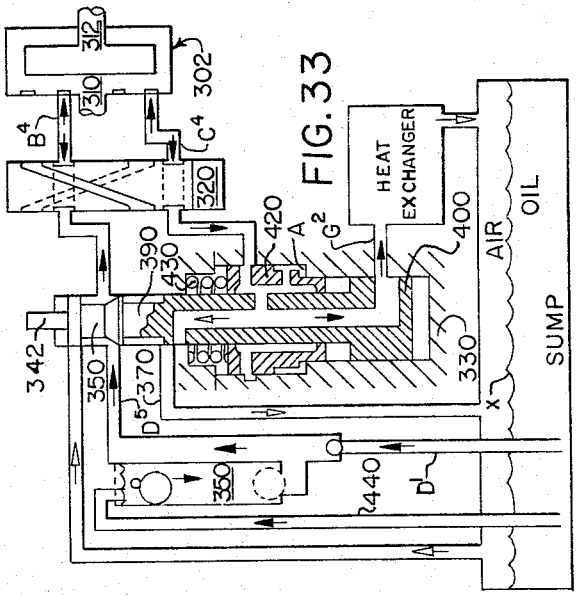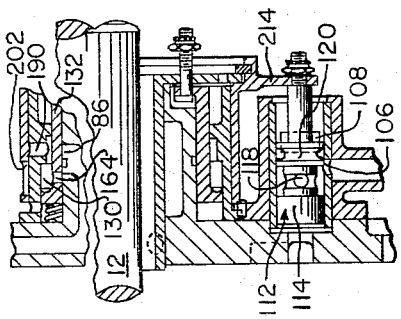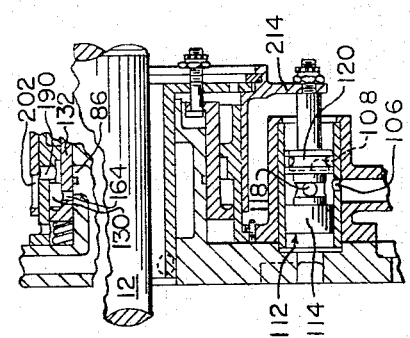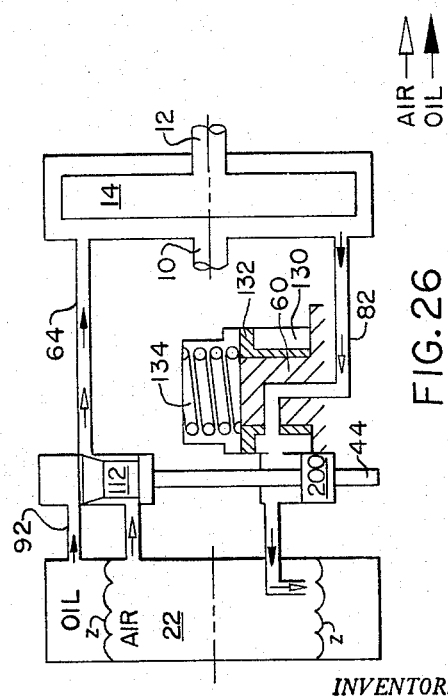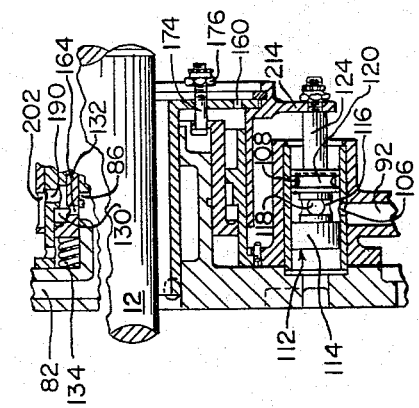

INVENTOR.
JOHN R. THOMAS

Sept. 27, 1966  J. R. THOMAS  3,275,114
CONSTANT SPEED CONTROL MEANS FOR VARIABLE POWER
TRANSMITTING HYDRAULIC APPARATUS
Filed Aug. 17, 1964  7 Sheets-Sheet 7

INVENTOR.
JOHN R. THOMAS
BY
Duane C. Bowen

United States Patent Office 3,275,114
Patented Sept. 27, 1966

3,275,114
CONSTANT SPEED CONTROL MEANS FOR VARIABLE POWER TRANSMITTING HYDRAULIC APPARATUS
John R. Thomas, 437 Floyd, Wichita, Kans.
Filed Aug. 17, 1964, Ser. No. 389,945
21 Claims. (Cl. 192—61)

My invention relates to constant speed control means for variable power transmitting hydraulic apparatus. The hydraulic apparatus is of the type variably transmitting power from a rotary driving member to a rotary driven member by pump means having relatively moving parts connected to said two members. When fluid supply to said pump means and fluid discharge from said pump means are controlled by valve means, variable transmission of power results. The hydraulic apparatus shown and described hereinafter is of the type variably admitting air and/or oil to said pump means, and controlling discharge, to control speed and/or torque.

More specifically, the constant speed control means includes:

(a) a chamber connected to the discharge passageway from the pump
(b) closure means operable to control fluid flow through the discharge passageway downstream from the chamber, whereby static pressure may be produced in said chamber
(c) a piston or the like exposed to said static pressure in said chamber and movable thereby
(d) spring means acting on said piston in opposition to the static pressure
(e) constricting means for the discharge passageway upstream of the chamber operable to restrict passage of fluid and movable by said piston
(f) whereby a constant speed effect is achieved at a level of static pressure when the spring is overcome, as the level of pressure is related directly to g.p.m. flow resulting from relative rotation between said rotary members and because any change in loads tending to change speed results in change in static pressure causing said piston to move and adjust the position of the constricting means to restrict or open passage of fluid to restore g.p.m. flow to its previous value.

The above outline will indicate the general nature of the invention but does not describe all of the functions or structure and is not meant to describe the scope of the invention but only is intended to give a brief introduction to the invention. It will be noted the system is directly responsive to g.p.m. flow changes and is not driven shaft connected.

I have done considerable work in the field before and the following of my prior patents form part of the background information pertinent to the type of equipment herein discussed:

(a) Patent 2,658,595, issued November 10, 1953
(b) Patent 2,712,867, issued July 12, 1955
(c) Patent 2,899,035, issued August 11, 1959
(d) Patent 3,144,923, issued August 18, 1964, entitled "Variable Power Transmitting Hydraulic Apparatus."

These prior patents are incorporated by reference herein so as to explain the general type of apparatus illustrated herein without unneeded description of structure not directly related to the present invention.

One type of hydraulic apparatus shown in the present and referenced inventions is a rotary housing system and the other type is a stationary housing system. In the former the hydraulic fluid is impelled by centrifugal force into a fluid annulus during operation and in the second type the reservoir of hydraulic fluid is static. I have further invented means for applying my concepts to both types of apparatus.

The preceding forms an introduction to my invention. The invention will be more specifically described in the following order.

I. A description of the problems to be solved and the objectives of the invention.
II. Description of the figures of the drawing.
III. General description of the invention.
IV. Description of the rotary housing form of the invention.
V. Description of operation of the rotary housing apparatus.
VI. Description of the stationary housing form of the invention.
VII. Description of operation of the stationary housing apparatus.

I. PROBLEMS AND OBJECTIVES

In some applications of the type of hydraulic apparatus above described, it is desirable at least at some speed levels to provide relatively constant speed at a setting of the hydraulic apparatus despite changes in load. This presumes power being applied to the driving shaft which is ample to sustain any additional load. In prior apparatus increases in load tended to decrease speed and decreases in load tended to increase speed. Therefore, in the prior apparatus it was common to have a relatively constant input speed and to have changes (without adjustment of manual control) in output speed responsive to load variations.

Such yielding of speed to load is desirable in some applications but is not desirable in others. In the first instance yielding to load is desirable and in the second instance substantially constant selective speed is desirable. In solving the problem posed by the second instance it is desirable to provide a basic structure that also can be adapted (a) to the yielding types of applications or (b) to afford dual capability to provide constant speed at some settings and to provide yielding speeds at other settings. It is also desirable to avoid surging or hunting, to provide as instantaneous a response as possible, and to achieve reliable and automatic operation in an economical and low maintenance structure.

The yielding-to-load operational driving characteristics required by certain kinds of apparatus are satisfactorily provided by devices of the type described in the above mentioned prior patents and applications, or perhaps by variable fill-controlled fluid couplings of the hydrodynamic type, e.g., wherein it is desirable for load speed to inversely vary with changes in load magnitudes. Those mechanisms however do not provide substantially constant selective speed. Fly-ball governor elements can be used in various ways to try to achieve constant speed control but, in addition to other unfavorable characteristics, the fly-ball governor has considerable plus and minus speed deviations in order to overcome friction and other forces associated with fluid controlling elements, such as mass inertia and hydraulic force imbalance, resulting in poor speed control response and inadvertent surging or hunting tendencies.

Objectives of my invention include the following:
(1) To provide constant speed control means in hydraulic apparatus
(2) To adapt such constant speed control means to rotary and stationary housing types of variable power transmitting hydraulic apparatus
(3) To provide said constant speed control system capable of automatically maintaining a selected substantially constant output speed transmitted to driven equipment by the apparatus, notwithstanding changes in torque demanded by the driven equipment, assuming a relatively constant input speed to the apparatus (4) To provide in one construction of the system the capability of being operated dually (a) to transmit manually controllable variable speed to the driven apparatus, which speed yieldingly varies inversely with changing torques or driving forces required by the driven apparatus, and (b) to transmit variably selective substantially constant speed to driven apparatus notwithstanding changing torques or driving forces required by the driven apparatus, such dual capabilities being accomplished without deletions from, or additions to, the general construction of the device (5) To provide certain novel fluid-pressure and fluid-flow controlling elements which, in direct association with fluid-circulating power-transmitting elements, will automatically maintain a variably selective substantially constant output speed regardless of major changes in loads imposed by the apparatus being driven (6) To provide the above without operatively connecting to the output shaft and avoiding fly-ball governor elements and otherwise avoiding considerable plus or minus speed deviations in order to overcome friction and other forces associated with fluid controlling elements, such as mass inertia and hydraulic force imbalance, thereby avoiding surging or hunting tendencies (7) To devise a constant speed control system adaptable to stationary housing hydraulic apparatus which may be used with heat exchangers of the type used in prior stationary housing apparatus without adversely affecting the flow of fluid to and from the heat exchangers (8) To minimize changes in structure used in prior rotary and stationary housing hydraulic apparatus (9) To provide in a rotary housing type of apparatus that the flow of air emerging from pump discharge be radially directed outwardly so the air will forcefully penetrate the oil annulus for beneficial admixture with oil, whereby, particularly in high speed applications of the invention, the fluid admixture will re-enter the suction circuit to provide more adequate lubrication of pump and associated members during possibly extended periods of neutral operation

(10) To provide in rotary housing apparatus at least one member in the constant control speed apparatus which has a generous length-over-diameter ratio so as to provide improved alignment and stability for the fluid flow controlling system

(11) To provide in a rotary housing apparatus separation of pump suction controlling elements from pump discharge control elements and to operatively connect the suction elements with the discharge elements by means such as bolts and spacers the lengths of which may be selected to provide variations in suction and discharge control relations according to operating characteristics desired, without major design change

(12) To provide a constant control means utilizing a piston element and to provide limiting means in the piston travel so as to produce a yielding character of output speeds when load changes occur which are excessive to planned load levels, whereby yielding-to-load can be provided upon the occurrence of excessive loads

(13) To provide a constant speed apparatus whereby matched sets of springs, working against such piston element mentioned above, can be interchanged, so as to affect the automatic response characteristics of the constant speed control system (this including the capability of substituting matched springs of such strength as to prevent operation of the piston, whereby load-yielding can be provided by mere interchange of springs), and

(14) To devise other desirable features such as high reliability, economical cost, low maintenance and simplicity.

Further objectives and advantages of the invention and the manner in which various problems are solved, will be understood from the following more specific description.

II. DESCRIPTION OF THE DRAWINGS

FIG. 1 is a longitudinal section, taken on line 1—1 of FIG. 2, through a mechanical, variable power-transmitting rotary housing hydraulic drive forming a specific embodiment of my invention.

FIG. 2 is an end view of the internal mechanism as seen at line 2—2 of FIG. 1 including an end elevation of part of the power-transmitting pump assembly, a portion of the internal mechanism being broken away to bring into view some of the pump body and pump gear elements.

FIG. 3 is an end view of the pump manifold as seen on line 3—3 of FIG. 1, showing the suction and discharge passages therein.

FIG. 4 is a partial view of the pump manifold, of the opposite side from that viewed in FIG. 3, including the manifold's hub.

FIG. 5 is a section, taken on line 5—5 of FIG. 4, showing the suction passages of the pump manifold.

FIG. 6 is a section, taken on line 6—6 of FIG. 4, showing the air intake passage through the pump manifold.

FIG. 7 is a section, taken on line 7—7 of FIG. 4, showing the discharge passages of the pump manifold.

FIG. 8 is a view, taken at line 8—8 of FIG. 7, showing a discharge passage within the pump manifold and illustrating a preferred form of one of the manifold hub's discharge ports.

FIG. 9 is an end elevational view of the flanged guide sleeve for the discharge control valve system.

FIG. 10 is a cross-section of the flanged guide sleeve taken on line 10—10 of FIG. 9.

FIG. 11 is an end elevational view of the speed selector sleeve element of the discharge control valve system.

FIG. 12 is a cross-section of the speed selector sleeve taken on line 12—12 of FIG. 11.

FIG. 13 is an end elevational view of the stationary cylinder element of the discharge control valve system.

FIG. 14 is a cross-section of the stationary cylinder taken on line 14—14 of FIG. 13.

FIG. 15 is an end elevational view of the automatically movable, fluid-flow pressure-responsive piston element of the discharge control valve system.

FIG. 16 is a cross-section of the piston taken on line 16—16 of FIG. 15.

FIG. 17 is a side elevation of one of the suction control valve elements of the control system as seen on line 17—17 of FIG. 2.

FIG. 18 is a cross-section taken on line 18—18 of FIG. 17 showing the oil admittance port closed during neutral operation of the hydraulic drive.

FIG. 19 is a cross-section taken on line 19—19 of FIG. 17 showing the air admittance port open during neutral operation of the hydraulic drive.

FIGS. 20, 21 and 22 are fragmentary sections taken on line 1—1 of FIG. 2, showing relative positions of the elements of the discharge control valve system during progressively advanced positions of the speed selector sleeve and its operatively connected suction control valve elements.

FIG. 23 is a fragmentary section taken on line 23—23 of FIG. 2, showing the relation of the adjustable travel-limiting screws to the fluid-flow pressure responsive piston.

FIG. 24 is a view of one of the discharge flow-control ports of the stationary cylinder as seen from line 24—24 of FIG. 14.

FIG. 25 is a view of one of the discharge flow-control ports of the speed selector sleeve as seen from line 25—25 of FIG. 12 and shown superimposed over one of the associated flow-control ports of the stationary cylinder, for the neutral operating position of the control system as illustrated in FIG. 1.

FIG. 26 is a schematical presentation of the rotary housing system shown in FIGS. 1–25.

FIG. 33 is a schematic illustration of the complete stationary housing apparatus viewed in FIGURES 27–32.

III. GENERAL DESCRIPTION

Figure 27:
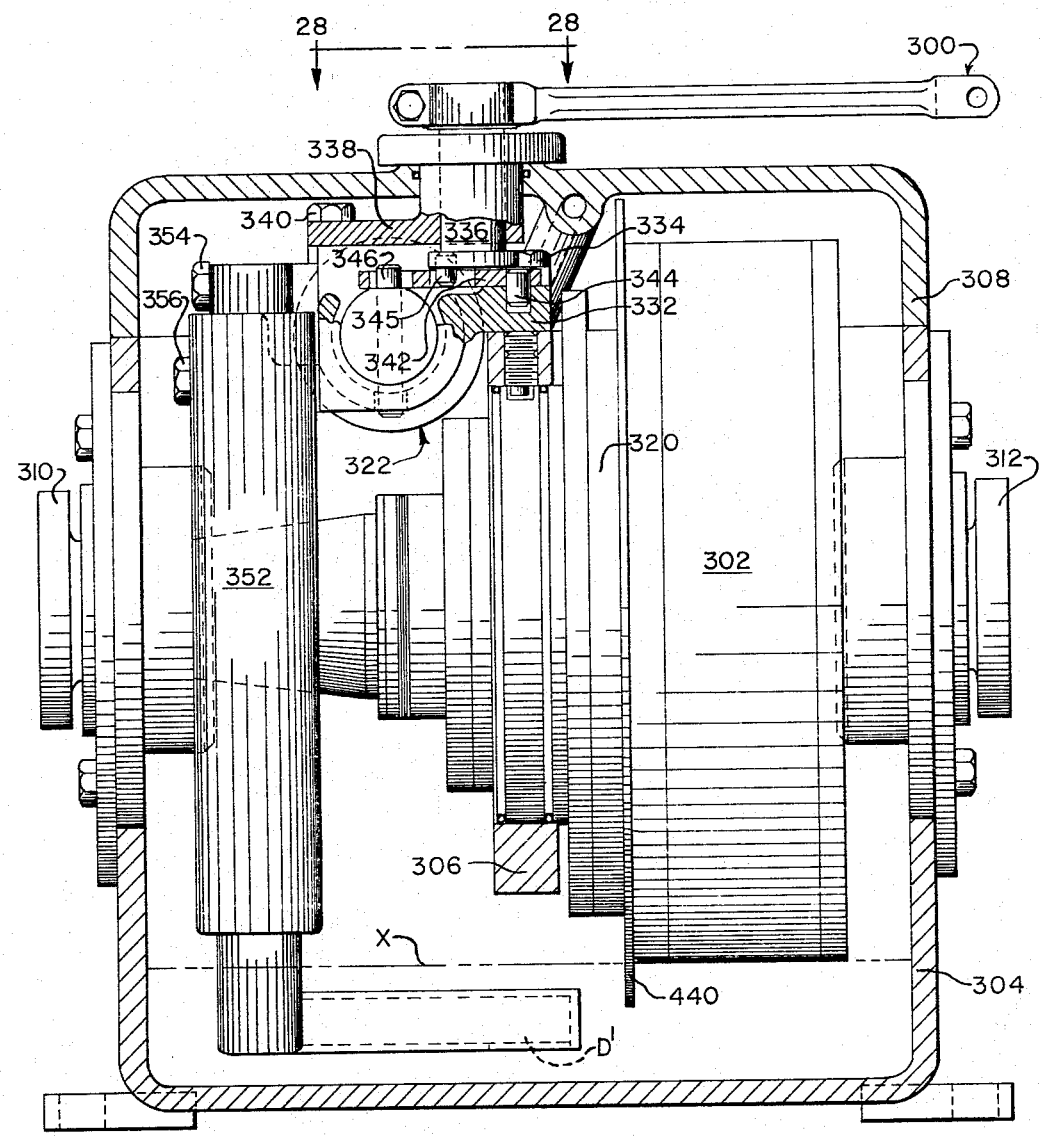
FIG. 27 is a side elevation, partly in section, of an embodiment of my invention, applied to stationary housing power transmitting apparatus.

Various solutions could be used to provide constant speed control. The weakness of the fly-ball governor approach has already been indicated. Other approaches would include complex electronic, electromechanical or possibly hydraulic systems, which, like the fly-ball governor approach are output shaft connected. I will not relate the disadvantages of more complex systems in terms of problems with response rates, expense, maintenance, etc., other than to note that a mechanical system connected to the driven shaft will have a relatively low effective response rate due to friction, tolerance, inertia, etc. I have devised a system which is highly satisfactory, and meets the above objectives and has other advantages that will be understood from the specific description.

I have discovered it is not necessary to connect to the driven shaft to provide constant speed control. Basically, my system is directly responsive to flow in the pump of hydraulic fluid (but not responsive to internal pump pressures). One way of speaking of this flow is the g.p.m. rate in the pump. If the hydraulic apparatus is set by the manual control to a particular setting and if the speed to the drive shaft is constant and the load on the driven shaft constant, it will be understood that the g.p.m. flow in the pump between driving and driven shaft will be constant. In these circumstances, any increase in loads will tend to increase the slip of the pump and to increase the g.p.m. flow. Conversely, a decrease in torque loads on the output shaft will tend to increase its output speed resulting in an inversely proportional decrease in rate of fluid flow.

I provide by the means of a chamber forming a part of the discharge circuit from the pump, or connected thereto, and by selectively constricting discharge at a point at the egress from the chamber or downstream therefrom, a chamber area where changes in g.p.m. flow are reflected by static pressure changes. A piston or the like is exposed to pressures in that chamber and is opposed by spring means. This means the piston will move responsive to static pressures at a level exceeding spring forces. The piston in turn controls the rate of flow from the pump at a point upstream of the chamber. The above system thereby provides that as loads increase and g.p.m. flow and static pressure increase, the piston acts to restrict pump discharge thereby reducing slip so that the g.p.m. flow to the chamber reverts its previous level. With g.p.m. flow reaching its previous level, the speed of rotation of the driven shaft has reached its previous level. (To the extent the piston acts instantaneously, g.p.m. flow and shaft rotations do not briefly deviate until load changes are compensated as described above.) Conversely, decrease in load results in decrease in g.p.m. flow and in static pressure, whereby the piston moves to permit greater flow from the pump whereby g.p.m. flow will reach its previous level and the driven shaft speed will be restored to its previous level.

The above is a simplified explanation but will introduce the following description which relates the detailed structure, operation, and relationships, and shows how the above function can be achieved in rotary housing and stationary housing forms of variable power transmitting hydraulic apparatus.

IV. ROTARY HOUSING APPARATUS

1. General working parts

Referring to FIGURE 1, the type of rotary housing variable power transmitting hydraulic apparatus shown is known in the art. The above citation of Patents 2,658,595, 2,712,867, and 2,899,035 includes part of the rotary housing devices which form the background of my invention. I will not describe in detail all of the structure shown in FIGURE 1 or the other drawings on the rotary housing apparatus in general, as the details not directly involved with the present invention will be readily understood by those skilled in the art and the present description would be needlessly protracted by describing that structure. Briefly, the old structure includes a drive shaft 10, an output or driven shaft 12, and interposed therebetween a pump generally referenced by the numeral 14. It will be understood that by control of air and/or oil suction to the pump and by control of discharge, power may be variably transmitted from shaft 10 to output shaft 12. Substantially no power will be transmitted if only air is present in the pump and shaft 10 and shaft 12 will rotate substantially in unison if plentiful oil is supplied to the pump and substantially no discharge is permitted.

The casing is generally referenced by numeral 20. The interior 22 of casing 20 forms an oil reservoir. During rotation of casing 20 the oil in compartment 22 forms an annulus having an internal diameter approximately on the lines Z, as shown in FIGURE 1. Input shaft 10 is attached to casing 20 to rotate the same and the casing rotatably supports, by end plate 24 and by manifold plate 26, a series of planet gears 28 which mesh with a central sun gear 30 which in turn is keyed to output shaft 12. The pump, or more generally the fluid-circulating power-transmitting instrumentality, is illustrated as being a multiple spur gear type of pump although any of the well-known positive displacement pumps may be substituted, such as spur gear, internal gear, gerotor, piston or vane types.

In FIGURE 1, the valve system is shown at the neutral position as positioned by the well-known system of shifter collar 40, shifter sleeve 42, and shifter rods 44, through use of the usual shifter fork (not shown). It will be observed that the neutral position is with the shifting mechanism fully outward or to the right as viewed in FIGURE 1.

The valve mechanism has two essential parts, a suction control valve generally referenced by numeral 50 and a discharge control valve, generally referenced by numeral 52. The discharge control valve incorporates constant speed control means which is the subject of the present invention. The suction control valve incorporates the usual functions of providing air, oil, or mixtures of the same to pump 14 to thereby variably control transmission of power from shaft 10 to shaft 12 in the lower range of power transmission. Discharge control valve 52, as well as incorporating constant speed control means, provides for substantially eliminating discharge of fluid from the pump in the fully engaged position of the shifter mechanism, whereby shafts 10 and 12 will rotate substantially together. The shifter mechanism therefore provides means for manual or other control of the hydraulic apparatus so as to transfer power from shaft 10 (which will usually have ample power from a constant speed driving source) to output shaft 12, which in turn is connected to the apparatus to be powered. The purpose of the constant speed control means, as before indicated, is to provide at least at certain speeds, constant speed of rotation of shaft 12 and delivered to the apparatus connected to shaft 12, despite decreases and increases in load on such apparatus.

Manifold plate 26 will be detailed in part before description of the valving system because although much of the structure is old and will be readily understood by those working in the art, the structure relates directly to suction and discharge and some features are novel relating to the constant speed control means.

2. Manifold (a) First describing portions of the manifold relating to suction, and referring to FIGS. 1 to 8 inclusive, pump manifold 26 is a plate-like casting comprising vertical wall portions including three circularly equally spaced radially disposed extensions consistuting closures extending over the pump body cavities for planet gears 28. Pump manifold 26 also has three circularly equally spaced radially disposed vertical wall portion extensions for suitable dowelled association with other parts of multiple gear pump 14. Pump manifold 26 has a centrally located hub-like portion 60.

Referring to the end views of pump manifold 26 as seen in FIGS. 3 and 4, as well as to the sections illustrated in FIGS. 5 to 8 inclusive, three typical pump suction trap-relief areas 62, shallowly recessed into the side of pump manifold 26 which is adjacent to the pump gears 28, 30, are extended by means of the recessed, curved fluid suction passages 64 and passages 66 through the manifold wall to connect with three sized circular recesses 68 used for mounting the bodies of suction control valves 50.

A plurality of suction air passages 70 within the wall portions of manifold 26, lead radially outward from the central bore of manifold hub 60 to emerge as circularly elongated openings 72 adjacent to the suction control valve body mounting recesses 68.

(b) Now describing the discharge related parts of manifold plate 26, typical pump discharge trap-relief areas 80 extend into radially inwardly disposed fluid discharge passages 82 within the vertical wall portions of manifold 26, then extend horizontally through manifold hub 60 as fluid discharge passages 84 to emerge at the outer cylindrical surface of hub 60 as three circularly equally spaced fluid discharge ports 86. All fluid discharge ports 86 are interconnected by a pressure-stabilizing groove 88. A preferred configuration for the fluid discharge ports 86 is shown in FIG. 8.

3. Suction valving

Now will be described one of the plurality of spool-type air and oil fluid suction control valves 50, preferably equivalent in quantity to the number of planet gears 28 employed, and a side elevation is shown in FIG. 17. Reference is also made to FIGS. 1 and 2, 17 to 19 inclusive and 20 to 22 inclusive. The body of valve 50 consists of a generally tubularly shaped portion, one side of which is horizontally enlarged so as to provide for a circularly elongated air passage 90 which emerges at the central bore of the valve body 50 and axially thereof at line 19—19 of FIG. 17 as shown in FIG. 19. The tubularly shaped portion has a radially disposed pipe-like column which contains an oil inlet passage 92. The inner end of the valve body comprises a flange portion 94 accommodating two mounting bolts 96 which pass through holes (not numbered) provided in flange 94, through pump manifold 26 and through the pump body for threaded engagement with pump end plate 24.

Flange 94 extends radially inwardly to terminate as a reduced thickness portion 98, the remaining wall of which is employed to retain a co-axially located stationary cylinder 100. One of the bodies of valve 50 has its reduced thickness portion provided with a control element timing lock-pin 102, later to be further mentioned but for the obvious purpose of clocking parts in the final assembly of the valving mechanisms.

Each valve 50 has a central bore which is sized to receive a press-fit valve seat 104 an end portion of which extends beyond the face of valve body flange 94 which is adjacent manifold 26, so as to assemble with close diametral fit within recesses 68 of pump manifold 26. Valve seat 104 is provided with an oil inlet port 106 which communicates with the valve body's oil inlet passage 92. Valve seat 104 is also provided with an elongated air inlet port 108 communicating with the valve body's air passage 90. It will be noted that the inlet (through flange 94) to the valve body's air passage 90 communicates with the circularly elongated openings 72 of pump manifold 26 (see FIGS. 2 and 4).

A hollow, spool-type fluid suction control valve 112 is slidably mounted within the valve seat 104. Valve 112 has an inner end portion 114 having sufficient length of major diameter surface to completely close the oil inlet port 106 when positioned as seen in FIG. 1, which illustrates the neutral position for the entire valve control system.

The central portion 116 of valve 112 is of reduced diameter and is provided with a plurality of passages 118 through the wall of the valve portion 116 which communicate with the hollow interior area of the valve 112. As seen in FIG. 1, reduced diameter valve portion 116, being aligned with the air inlet port 108 of valve seat 104 for neutral operation, provides space for inlet fluid to encircle the valve portion 116 for flow through the passages 118 and the hollow interior of valve 112.

The outer end portion 120 of valve 112 (to the right as viewed in FIGURE 1) has the same diameter as the valve's inner end portion 114 (to the left as viewed in FIGURE 1). The end portion 120 may be counter-bored, or grooved as shown so as to remove excess weight from valve 112.

Outer end portion 120 includes an end wall which is provided with a centrally located hole having substantial clearance over the body diameter of a valve actuating bolt 122. The head of actuating bolt 122 in association with a tubular spacer 124 and a self-locking nut 126 assembled on the threaded end of bolt 122, transmits appropriate push-pull motion to valve 112.

It will be understood from the foregoing that push-pull of bolt 122 operates the suction valve to meter only air, only oil, or mixtures of air and oil. When bolt 122 is to the right as viewed in FIG. 1, only air will pass to the pump through air passage 90 then through the body of valve 112 and to the pump. When bolt 122 has moved sufficiently to the left, only oil is metered through inlet passage 92 from oil reservoir 22 and through the center of valve 112 into the pump. Further movements to the left of bolt 122 do not affect the suction valve operation, e.g., it continues to meter all oil. Some intermediate positions will variably mix oil and air for suction supply to pump 14. As will be later related, this cycle of operation is also related to movements of portions of the discharge valve system 52, which moves in unison with the suction mechanism, both being moved by the shifter parts 40, 42, 44.

4. Discharge valving and constant speed control system

The discharge control valve 52 which incorporates constant speed control means will now be described. FIGS. 1, 2, 9 to 16 inclusive and 20 to 25 inclusive are pertinent to the selectively-variable, automatically constant output speed-maintaining fluid discharge control system. As before indicated, briefly the system includes a chamber 130 and a movable piston 132 opposed by spring means 134. Chamber 130 and piston 132 have annular forms about the axis of driven shaft 12, e.g., discharge valve means 52 and the constant speed control means are formed primarily with parts and an assembly annularly disposed about shaft 12. Static pressures are formed in chamber 130 in certain modes of operation and, when spring means 134 is overcome, piston 132 acts to restrict pump discharge. When loads increase and g.p.m. flow and static pressure increase, piston 132 acts to restrict pump discharge thereby reducing pump slip so that the g.p.m. flow to chamber 130 reverts to (or is maintained at) its previous level, and the speed of rotation of driven shaft 12 is restored to its previous level. The reverse happens with decreases in load. The following will more specifically describe the parts and their operation.

An axially slidable control system guide element 140 (see FIGS. 1, 9 and 10) has a cylindrical hub portion 142 and a radially outwardly extending flange portion 144. Hub portion 142 is sized for suitable sliding movement within the central bore of hub 60 of pump manifold 26.

Flange 144 of guide element 140 is provided with preferably three holes 148 each receiving a travel-limiting bolt 150 together with a tubular space 152, the axial length of which establishes the total axial travel provided for guide element 140. Bolts 150 engage threaded holes provided in the outer end of pump manifold hub portion 60 and the bolt heads function as stop means for limiting the outward travel of the guide element 140.

Flange portion 144 has preferably three threaded holes 154 each receiving a slotted travel-limit adjusting screw 156 accompanied by a self-locking jam nut 158 (see FIG. 23). The function of the adjusting screws 156 is to limit outward travel of piston 132, as will be described again later. Flange 144 also is provided with a passage 160 to permit free exchange of fluids between the enclosed area within the control system and the main fluid compartment or chamber 22.

The axially-slidable, automatically-movable, fluid-flow pressure-responsive fluid discharge control piston 132 consists of a hollow, cylindrically shaped body provided with a flanged inner end portion 162 (see FIGS. 1, 15 and 16). The piston's cylindrical body has a plurality of circularly-equally-spaced, elongated fluid discharge metering ports 164 for controlling the flow of fluids out of fluid discharge ports 166 of manifold hub 60 into chamber 130, thereby providing pump discharge passageway constricting means. The outer vertical face of flange 162 has a circular groove 168, to avoid face abutment of the effective piston face, as will be hereafter described.

The outer end of piston 132 has preferably three circularly equally spaced, inwardly extending lugs 170, each having a hole 172 sized for an interference fit with the body of an adjustable travel-limiting bolt 174, the threaded outer end of which is provided with a self-locking nut 176, bolts 174 acting as travel limiters on piston 132. Bolts 174 pass through openings 175 in guide element flange 140.

The inside diameter of the cylindrical body of the fluid discharge control piston 132 is sized for appropriate axial movement upon manifold hub 60. The outer end of manifold hub 60 is provided with recessed areas 178 having ample clearance for lugs 170 and for the heads of the travel-limiting bolts 174.

Piston flange 162 has a plurality of circular recesses 180, each of which is fashioned to receive the end of the compression spring 134. Pump manifold 26 has a like number of circular, preferably deep recesses 182 which are aligned with recesses 180 (see FIGS. 1, 3 and 4), to accommodate the inner ends of spring means 134. Springs 134 are matched as a set so as to perform with substantially uniform force.

Piston 132 is surrounded by an axially retained, stationary outer cylinder 100 (see FIGS. 1, 13 and 14). Cylinder 100 consists of a flanged inner end portion 184 and a tubular body having a uniform outside diameter. An inner end inside portion 186 is sized for appropriate fluid-retaining sliding fit upon piston flange 162.

An intermediate inside portion 188 of cylinder 100 has a somewhat reduced diameter so as to provide a shoulder stop for piston flange 162 to establish the control piston's neutral operating position. It will be noted (see FIGS. 1 and 16) that the width of groove 168 is greater than the height of the above described shoulder so as to permit fluid pressure within chamber or compartment 130 (see FIGS. 1 and 20 to 22 inclusive) to be exerted against practically the total face area of the piston's flange 162 whether said flange is resting against the shoulder stop or whether the fluid discharge control piston has moved inwardly away from the shoulder as viewed in FIGS. 20 to 22 inclusive.

The cylinder's intermediate inside portion 188 is provided with a plurality of discharge flow-control ports 190, which provide egress from chamber 130. A preferred configuration of openings 190 is shown in FIG. 24.

An inwardly extending flange portion 192 of the cylinder is illustrated as being axially located immediately outwardly adjacent fluid control openings 190. Flange 192, however, may be located axially outward from the position shown, even to a position at the extreme right or outer end of cylinder 100, as may be desired. The inside diameter of flange 192 is sized for appropriate fluid-retaining sliding fit upon the outside surface of the cylindrical body portion of piston 132. It will be understood that annular chamber 130 is defined by cylindrical opposed surfaces of piston 132 and cylinder 100 and by piston flange 162 and by portions of cylinder 100 including flange 192.

The outside diameter of the cylinder's flange 184 is sized to accommodate possible assembled eccentricity with the circularly machined recesses of the suction control valve bodies' flanges 98 which are employed to retain cylinder 100 from axial movement. Sufficient clearance is provided between cylinder flange 184 and the valve bodies' flanges 98 to permit cylinder 100 to readily move into concentric relation with discharge control piston 132. It will be noted that a lock-pin 102, installed in one of the suction control valve body flange portions 98, is engaged in a timing groove 194 of the cylinder flange 184 to maintain the cylinder's rotational alignment with manifold 26 and with other elements of the fluid discharge control system.

Cylinder 100 is provided with a relatively small passage 196 to allow for escape of fluids from the enclosed area within which are mounted springs 134. The passage 196 is subject to sizing so as to afford damping of the axially sliding movement of control piston 132 as may be desired.

To now discuss the manual speed control or setting portion of the discharge valve system, cylinder 100 is encircled by a speed selector sleeve 200 the inner end portion of which is provided with a plurality of discharge flow-control ports 202 (see FIGS. 1, 11, 12, 20 to 22 inclusive and 25). Flow-control openings 202 (having the preferred configuration shown in FIG. 25) are circularly spaced to coincide with the positions of flow-control openings 190 of cylinder 100. This means that by moving ports 202 and 190 out of registry, closure means are provided for pump discharge downstream of chamber 130, whereby static pressure may build, or pump discharge can be substantially blocked if ports 202 and 190 are brought to positions completely out of registry.

The outer end portion of speed selector sleeve 200 has bossed lug portions 204, preferably three as shown, having holes 206 sized to accommodate the inner ends of shifter rods 44 for movement of sleeve 200 by the shifting mechanism 40, 42, 44. A groove 208 is provided within a central bore 210 within the outer end portion of sleeve 200 so as to receive a snap ring 212.

The outer end portion of sleeve 200 is also provided with a plurality of radially outwardly extending lugs 214 which are circularly spaced to coincide with locations of suction control valve bodies 50. Lugs 214 have holes 216 sized to permit the threaded ends of the suction control valve actuating bolts 122 to pass therethrough. This means that suction control valves 50 are operated by speed selector sleeve 200, responsive to shifting mechanism 40, 42, 44, simultaneously with the adjustment of sleeve 200 of discharge valve 52.

The main cylindrical hub portion of sleeve 200 (which includes the area of flow-control ports 202) is bored for an appropriate sliding fit upon the outside surface of axially retained cylinder 100.

Central bore 210 of the outer end portion of sleeve 200 terminates at a distance to the left, as viewed, of snap ring groove 208, which distance is only slightly greater than the thickness of flange 144 of the guide element 140. Central bore 210 has a sufficiently greater diameter than flange 144 to accommodate possible assembled eccentricity between the flange 144 and the speed selector sleeve's bore 210. These assembly clearances permit free self-alignment of guide element 140 and sleeve 200 with their respective sliding fit surfaces, namely, the central bore of pump manifold hub 60 and cylinder 100, respectively.

Snap ring 212 serves to retain flange 144 within speed selector sleeve 200, and snap ring 212 assembles into the appropriately grooved inner ends of shifter rods 44 so that axial movement of shifter rods 44 as imparted by shifter collar 40 will also be imparted to sleeve 200 and to guide element 140.

5. Adjustments to suction and discharge valve assemblies

Now will be reviewed certain important operative alignment provisions for parts of suction valve 50, guide 140, piston 132, cylinder 100, and sleeve 200 of the suction and discharge valving assemblies, including a description of adjustment of bolts, screws, and nuts 174, 176, 156, 158 which are provided for the purposes of optionally limiting the axial automatic travel of fluid discharge control piston 132:

(a) Each suction control valve spool 112 (slidably installed within valve seats 104) is simultaneously axially moved with guide element 140 and speed selector sleeve 200, by bolt 122 and spacer 124 which are maintained in proper assembled relation by adjustment of the self-locking nut 126 in such manner that no perceptible relative axial motion is permitted between valve 112 and guide element 140 but valve 112 is permitted to radially align with its seat 104 at all positions due to ample clearance of bolt 122 within the centrally located hole through end portion 120 of valve 112.

(b) The length-over-diameter ratio for guide element's hub 142, even as minimally supported within the central bore of pump manifold hub 60, insures vertical plane stability for flange 144 throughout the axial movement of guide element 140. Bolts 150 and tubular spacers 152, installed through guide elements flange holes 148, with the bolts threaded into pump manifold hub 60, causes unitary rotation of guide element 140 with pump manifold 26.

(c) Unitary rotation of speed selector sleeve 200 with pump manifold 26 is assured by the shifter rods 44 being carried by a casing 20 which surrounds the chamber 22, casing 20 having a peripheral flange 21 bolted to the body of pump 14 to which pump manifold 26 is also bolted.

(d) The axially slidable fluid discharge control piston 132 has its inwardly extending lugs 170 provided with bolts 174 which are snugly interference-fitted through lug holes 172. The heads of bolts 174 are preferably fashioned so as to clear the inside circumferential surface of the piston 132 and still prevent bolt rotation while adjusting self-locking nuts 176. Bolts 174 insure unitary rotation of piston 132 with pump manifold hub 60 and outer cylinder 100, which is rotationally carried with pump manifold 26 by means of lock-pin 102 as heretofore described.

Referring to FIGS. 1 and 20, it will be noted that when shifter collar 40 and its operatively connected speed selector sleeve 200 and guide element 140 are moved toward pump manifold 26 (see FIG. 1) approximately two fifths of their total travel, being an intermediate control system position to that shown in FIGS. 1 and 20, the illustrated adjustment position for self-locking nuts 176 on bolts 174 would restrict the maximum allowable automatic inward travel of fluid discharge control piston 132, whereby the piston's discharge metering ports 164 are still in substantial communication with fluid discharge ports 86 of pump manifold hub 60 for continued fluid discharge therethrough. It will also be noted that oil inlet ports 106 would be partially opened for oil entry into the pump circuit while air inlet ports 108 would be about half closed.

(e) Referring to FIGS. 1, 2 and 23, the adjusting screws 156 are illustrated to have been adjusted so as to project beyond the inner face of flange 144 to abut the outer end of discharge control piston 132, forming stops for the outward travel of piston 132 relative to the position of flange 144.

It will be seen that the total range of automatic inward and outward travel of piston 132 relative to flange 144 and to all of the control elements operatively connected thereto, may be increased or decreased as desired by adjusting the positions of self-locking nuts 176 on their bolts 174 and screws 156 with their jam nuts 158.

V. OPERATION OF ROTATION HOUSING APPARATUS

1. Suction circuits and their control

Rotation of the hydraulic drive will be assumed as clockwise, as indicated by the arrow in FIG. 2. Fluid chamber 22 (which extends transversely through pump 14 and to opposite ends of casing 20) is partially filled with oil which, during the rotation of the casing, forms an oil annulus having a central core of air which for illustration is defined by the broken lines designated by Z in FIG. 1.

Being selectively controlled by the position of the suction control valves spools 112 relative to oil inlet ports 106 and air inlet ports 108, fluid is admitted through valve ports 118 for axial flow through hollow valve 112, thence through manifold passages 66 for flow through curved suction passages 64 and into the trap relief areas 62, for entry into the enlarged intake cavities within pump body 14 formed by recessed walls 220.

1ª. Air circuit—suction

When valve spools 112 are positioned as illustrated in FIG. 1, substantially only air flows through suction passages 70 and 72 of manifold 26, traveling from the central core of air within fluid chamber 22, thence through passages 90 within the bodies of valve 50 to enter air inlet ports 108 and the suction circuit heretofore described.

1ᵇ. Air and oil mixtures—suction

As valves 112 are moved to the position shown in FIG. 20, wherein their outer end portions 120 have just closed air inlet ports 108 and oil inlet ports 106 have been fully opened, diminution of air flow and simultaneous increase of oil flow is afforded the suction circuit, blending into proportional mixtures until only oil, flowing through the valve body oil inlet passages 92 and oil inlet ports 106, is provided for the suction circuit.

1ᶜ. Oil circuit—suction

During further movement of suction control valves 112 to the left from their position shown in FIG. 20, as illustrated in FIGS. 21 and 22, valves 112 remain in dwell and function to supply only oil to the suction circuit as described in the last phase of 1b. Secondary closing of air passages 70 by cylindrical hub portion 142 of guide element 140 as shown in FIGS. 21 and 22, will not affect the maintenance of air segregation from the suction circuit as provided by spool suction valves 112.

It should be noted that different lengths of tubular spacers 124 readily may be employed so as to provide various operating characteristics as pertaining to control of the suction circuits in relation to control of the discharge circuits hereafter described.

2. *Discharge circuits and their control*

Referring particularly to FIGS. 1–3, 7–16, 24 and 25, all fluids admitted for passage through the suction circuits and entering the enlarged intake cavities within pump 14 formed by recessed walls 220, fill the interdental spaces between teeth of the sun gear 30 and like spaces of the coacting planet gears 28 so as to be pumped into the enlarged discharge cavities within pump body 14 formed by recessed walls 222. The discharged fluid then enters trap relief areas 80 to flow through radial passages 82 and horizontal passages 84 within pump manifold 26 for controllable exit through the manifold hub's discharge ports 86.

It will now be noted that all of the discharged fluid emerging from ports 86 passes through the discharge-metering ports 164 of fluid discharge control piston 132 and into compartment 130 which surrounds piston 132. Compartment 130 is also disposed within the axially retained outer cylinder 100, terminating outwardly at the cylinder's flange portion 192 and inwardly at flange 162 of piston 132.

After entering compartment 130, the discharged fluid, under conditions hereafter described, may pass through discharge flow-control ports 190 of outer cylinder 100 and the speed selector sleeve's associated flow-control ports 202 for entry into fluid chamber 22, from which it is available to again enter air inlet passages 70 and/or oil inlet passages 92 of the suction circuit as heretofore described.

It should be noted that compression springs 134 function to urge discharge control piston 132 axially outwardly toward, or to, the shoulder stop formed by portion 192 of cylinder 100, also that fluid pressures which may be generated within compartment 130 will tend to urge piston 132 axially inwardly as such generated fluid pressures react upon stationary flange 192 and flange portion 162 of the movable piston 132.

3. *Control system in neutral, drive delivering minimum (residual) torque*

When, by means of shifter collar 40, the drive's fluid control system is moved outwardly to the position shown in FIG. 1, wherein flanged guide element 140 is stopped by the heads of bolts 150 substantially only air traverses the suction circuit for passage through the power-transmitting pump and through the discharge circuit.

It should be noted that the direction of air flow emerging from the speed selector sleeve's flow-control ports 202 is radially outward within the central core of air of chamber 22, rather than emerging radially inward as is characteristic with all of the valve-controlled discharge ports embodied in my prior patents referenced herein and also embodied in my prior Patents No. 2,526,914 and No. 2,531,014. This radially outwardly directed flow of air penetrates the oil annulus as at line Z, whereby some of the oil intermingles with the air, forming an oil-laden vapor to assist in lubricating relatively moving elements of the drive, particularly important in high speed applications of the invention during possibly extended periods of neutral operation.

All oil inlet ports 106 are closed by end portions 114 of suction control valves 112 and all valve seat air inlet ports 108 are open to provide for flow of air through the suction circuit, during the described neutral operation of the drive. All fluid discharge openings, as controlled by the position of ports 202 relative to ports 190 (see FIG. 25), provide adequate exits for the free circulation of air through the power-transmitting pump and its fluid control system.

4. *Control system positioned for partial engagement, drive delivering low torque and/or speed*

As the shifter collar connected fluid control system is moved inward from the position shown in FIG. 1 toward the position shown in FIG. 20, in-flow of air is gradually diminished and in-flow of oil is simultaneously progressively increased as the end portions 114 of suction valves 112 uncover the oil inlet ports 106 of the valve seats, until substantially only oil is entering the suction circuit.

5. *Control system positioned for an automatically governed constant low output speed level which is substantially unaffected by torque load changes on the output shaft*

Referring to the control system position illustrated in FIG. 20, it will be seen that speed selector sleeve 200 has been moved inward to a location wherein its fluid-flow control ports 202 are sufficiently out of register with fluid-flow control ports 190 of cylinder 100 for reducing the effective areas of these ports so as to regulatively restrict the flow of the fluid from within compartment 130 during its passage into chamber 22. This fluid-flow restriction, the magnitude of which depends upon the selective positioning of speed selector sleeve 200, generates sufficient static fluid pressure within compartment 130 to overcome the combined axial force of springs 134 being exerted outward on piston 132 whereby it is moved inward to the position shown because of substantial rise in static pressure upstream of ports 202, 190. (Static pressures up to the point ports 202, 190 move out of maximum registry, are so nominal as not to overcome springs 134 and may be ignored.) The discharge control ports 164 of piston 132 are now partially out of register with the pump manifold hub's discharge ports 86.

The particular lessening of total area of discharge ports 86 by the inward movement of control piston 132 shall be assumed, for purposes of example, to have provided the desired selective low constant output speed level for output shaft 12 as obtained through positioning of speed selector sleeve 200 by shifter collar 40.

Referring particularly to FIG. 1, it will be understood by those acquainted with the art, that each level of torque load imposed by driven apparatus upon output shaft 12, to which said driven apparatus is operatively connected, results in proportional hydrostatic fluid pressure within discharge passages 84, also that this fluid pressure is expressly confined within the power-transmitting pump and within the passages 84 as regulated by the piston's ports 164 being moved out of, or into, registration with the pump manifold hub's discharge ports 86. Consequently, the herein described static fluid pressure within compartment 130 is solely related to the specific gallons per minute (g.p.m.) flow of fluid into and out of compartment 130 as obtained by the selective positioning of the speed selector sleeve's ports 202 relative to the stationary cylinder's ports 190, whereby a selected output speed level has been obtained. (Nominal static pressures at lower driving ranges before piston ports 164 move out of maximum registry with ports 86 are unsubstantial and may be ignored.)

5a. *Description of automatic compensation for load torque increase so as to maintain the desired selected output speed*

Assuming that the source of power which is rotating the hydraulic drive is maintaining a relatively constant speed of input therefor, any selected output speed which is less than the provided input speed results in inversely proportional fluid flows through the power-transmitting pump and its control system. For example, a selected relatively low output speed would produce a relatively high g.p.m. fluid flow. Conversely, a high output speed would produce a relatively low g.p.m. fluid flow, there being a specific quantity of g.p.m. for each selected level of output speed.

Consequently, a load torque increase tends to lower the output shaft speed causing a corresponding increase in g.p.m. fluid passage through compartment 130, resulting in a static pressure rise therein to move piston 132 inward to close discharge ports 86 sufficiently to carry the increased load torque, such changed piston position being accompanied by re-establishment of the g.p.m. fluid flow through compartment 130 to precisely the g.p.m. specifically related to the originally selected speed level.

5b. *Description of automatic compensation for load torque decrease so as to maintain the desired selected output speed*

Any decrease in load torque imposed upon output shaft 12 will result in a tendency to increase its output speed. However, any increase in output shaft speed will produce an inversely proportional decrease in g.p.m. flow through compartment 130, causing a reduction in the static fluid pressure therein, wherewith the force exerted by springs 134 will automatically move piston 132 outward to a position wherein it will increase the fluid discharge through discharge ports 86 until the fluid flow into and out of the compartment 130 results in the re-establishment of the g.p.m. flow through compartment 130 to precisely the g.p.m. specifically related to the originally selected output speed level, whereby the desired selected output speed level is likewise re-established.

6. *Control system's speed selector sleeve positioned for an automatically governed constant high output speed level*

Referring to FIG. 21, speed selector sleeve 200 is shown moved further inward to a position wherein its flow-control ports 202 are almost out of register with flow-control ports 190 through which ports fluid from within compartment 130 must flow. A relatively small amount of fluid is permitted to flow from compartment 130; consequently the static fluid pressure within compartment 130 increases until it causes piston 132 to move still further inward from its position shown in FIG. 20, as illustrated in FIG. 21, wherein the g.p.m. fluid flow passing into and out of compartment 130 is such that a relatively high constant output speed level is selectively obtained. When varying torque loads are imposed upon output shaft 12, piston 132 will quickly move inwardly or outwardly to compensate for such torque load variations in the same manner described in 5, 5a and 5b above, thereby maintaining a substantially constant speed of output shaft 12.

It will be noted that for any selected speed level within the limits of minimum and maximum governed output speed (as provided by the selectively variable, automatically constant output speed-maintaining control system hereinabove described), the g.p.m. flow rate established by the selective positioning of speed selector sleeve 200 will be substantially equalled by the g.p.m. flow rate permitted by the automatic fluid discharge control piston 132 to escape from the pump manifold hub's discharge ports 86 into compartment 130. While piston 132 moves (a) inward to decrease the total area of ports 86 to compensate for increased loads and (b) outward to increase the effective total area of ports 86 to compensate for decreased loads, in so doing the resultant g.p.m. fluid flow from ports 86 and into compartment 130 will closely approximate the g.p.m. fluid flow through speed selector sleeve's ports 202, the slight differential between the g.p.m. flow into and out of compartment 130 resulting in static pressure variations within said compartment which are sufficient to effect proper positioning of piston 132 so as to maintain a selected constant speed for output shaft 12.

7. *Control system's speed selector sleeve positioned for full engagement*

FIG. 22 illustrates speed selector sleeve 200 having been moved inward until flange portion 144 of guide element 140 is stopped by the outer end pump manifold hub 60, wherein the speed selector sleeve's ports 202 are completely out of register with flow-control ports 190 of cylinder 100. Fluid flow out of compartment 130 has been completely arrested. Static fluid pressure within compartment 130 will now be related to the hydrostatic fluid pressures within discharge passages 84 and their discharge ports 86 only to the extent which is required to maintain an inward direction of force on piston 132 that is continually slightly greater than the combined force of springs 134. Only a very slight opening will be maintained through discharge ports 86 by the piston's discharge control ports 164, said opening being just sufficient to provide the described static pressure within compartment 130. Consequently piston 132 will constantly be automatically positioned for immediate response in maintaining a selective constant output shaft speed whenever the speed selector sleeve is moved to obtain an output shaft speed lower than its speed at full engagement.

From any control position selected for speed selector sleeve 200, inwardly from the neutral position which is illustrated in FIG. 1, sleeve 200 may be immediately returned to the neutral position and the drive will also immediately return to neutral operation since (a) all suction control valves 112 will provide for substantially only air to enter the suction circuit, and (b) since all static pressure is relieved from within compartment 130, springs 134 will have moved piston 132 completely outward as illustrated in FIG. 1 whereby the pump-circulated air freely flows through ports 86, 164, 190 and 202 for entry into fluid chamber 22 and re-entry into suction air passages 70.

From the foregoing description of one exemplary construction of the invention taken with the description of operation thereof, it will be clearly seen that the following described additional features are accomplishable without departure from the spirit of the invention:

8. *For output speeds to have only yielding-to-load operating character*

For applications of the invention wherein output speed levels of only a yielding-to-load nature of operation are desired, sets of compression springs 134 having a combined force sufficient to maintain piston 132 at its outermost position as viewed in FIG. 1, may be employed. The outer cylinder's flow-control ports 190 then act as discharge ports for the power-transmitting pump, selective output speed levels being obtained by appropriate positioning of speed selector sleeve 200, similarly as heretofore described for obtaining selectively variable constant speed levels.

9. *For output speeds having adjustably limited constant speed maintenance ranges with yielding-to-load speed deviations below and/or above said ranges*

Various combinations of adjustments of travel-limiting bolts 174 and their nuts 176, together with travel-limiting screws 156 and their jam nuts 158 can be performed so as to limit the automatic inward or outward travel of piston 132, whereby load changes above or below certain desired limits will effect a yielding of the output speed to such load changes. Inasmuch that flanged portion 144 of guide element 140 provides a base for all such adjustments and said base is movable directly with speed selector sleeve 200, the described limiting of the automatic travel of the piston is provisional and adaptable practically throughout the selective variable speed range.

VI. STATIONARY HOUSING APPARATUS

The general stationary housing construction and operation are similar to the construction shown and the operation described in my Pat. No. 3,144,923, above identified. Many of the features common to rotary and stationary housing apparatus are also shown in the other prior art above cited and otherwise known in the art. My invention here is primarily in providing a constant speed control system for such stationary housing apparatus. It will not detail much of the construction not particularly closely concerned with the constant speed control system, as it will be readily understood by those skilled in the art from the above references and otherwise, and the present specification should not be lengthened by unneeded description.

1. *General description*

Figure 28:
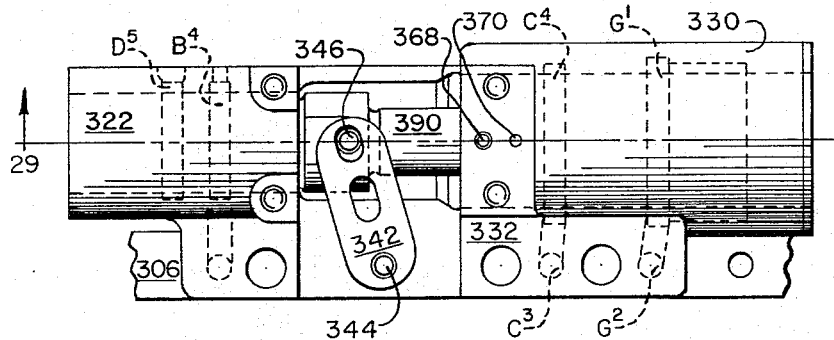
FIG. 28 is a top view of the valve housing and the neutral control valve actuating bar as observed at line 28—28 of FIG. 27, the receptacle cover and the control lever having been removed.
Figure 29:
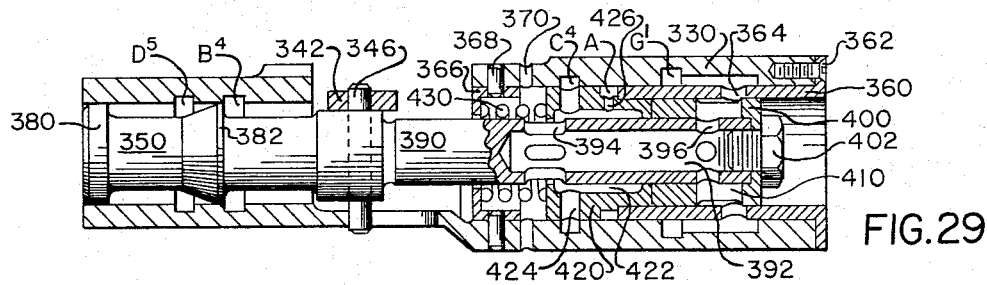
FIG. 29 is a typical vertical section of the control system, taken on line 29—29 of FIG. 28, a portion of the speed selector valve stem being broken away to show its internal porting, the surrounding automatically movable, constant speed controlling piston and other associated parts also being in section.
Figure 30:
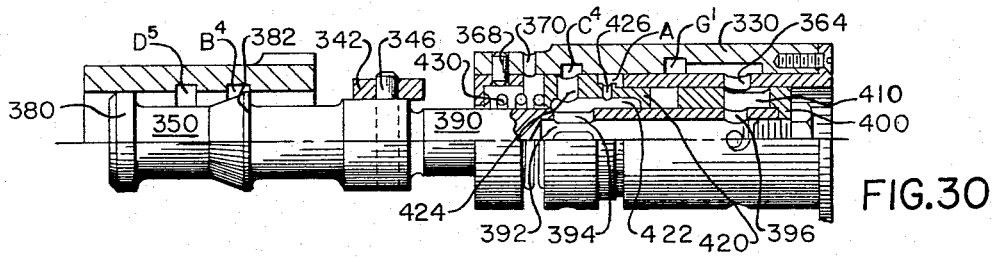
FIG. 30 is a half-vertical section of the valve housing with a side elevation of the speed selector sleeve, the automatic discharge control piston with its compression spring and spring retainer and the neutral control valve, some of the items in the half-vertical view being broken away or in section to show internal porting and passages.
Figure 31:
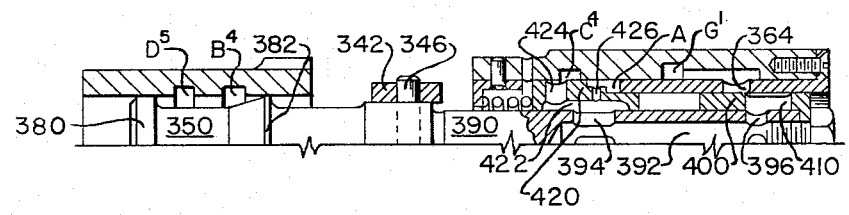
FIG. 31 is a half-vertical section of the valve housing, the constant speed-controlling piston and some of the other associated parts, the neutral control valve and a portion of its valve stem being shown in side elevation.
Figure 32:
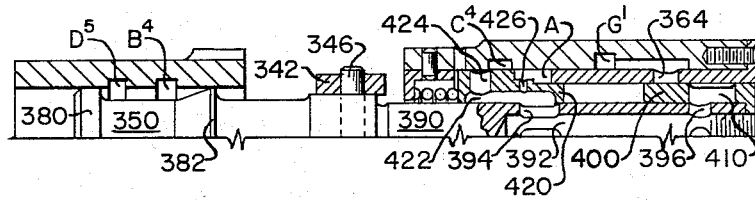
FIG. 32 is a view identical to FIG. 31 with the speed selector sleeve and other associated parts being shown at a fully engaged position.

To first briefly describe the structure that is old, FIGS. 28 and 29 illustrate the control system in neutral position, as accomplished by appropriate manual or other control actuation of a control lever 300; FIGS. 30, 31, and 33 illustrate approximate control element positions and relations for providing and maintaining various selective levels of output speed; and FIG. 32 shows the condition of the system upon full engagement by actuation of control lever 300 to its operative "on" limit.

In specific embodiment of my stationary housing apparatus, FIGURE 27 shows a fluid-circulating power-transmitting pump 302 rotatably supported by the end walls of a stationary receptacle 304 and by an intermediate receptacle support web 306, and a receptacle cover 308 which, together with receptacle 304, forms an appropriate fluid-retaining chamber. A power input shaft 310 and a power output shaft 312 extends into and out of receptacle 304.

Referring to FIGS. 27 and 33, an automatically operable port transfer unit 320 is shown interposed between pump 302 and a control valve assembly 322. Port transfer unit 320 accomplishes a directional flow reversal for fluid suction and fluid discharge passages leading to and from pump 302, providing a unified direction of fluid flow through control valve assembly 322 regardless of the direction of input rotation of pump 302.

2. *Valving and constant speed construction*

Referring to FIGS. 27, 28 and 29, my novel control valve 322 includes a valve housing 330 which has a mounting flange 332 fastened to the machined top surface of receptacle web 306 by a plurality of bolts 334. A control shaft 336 is rotatably supported by a control shaft support member 338 which is mounted upon valve housing 330 by use of a plurality of bolts 340. The control lever 300 is suitably fastened to an externally extending portion of control shaft 336.

A valve actuating bar 342 is pivotally supported upon valve housing flange 332 by a pivot pin 344. Control shaft 336 has an offset valve bar-actuating pin 345 which engages an elongated slot in bar 342 to impart an oscillatory motion thereto during rotation of control shaft 336 by lever 300. Another elongated slot, located in the end portion of valve actuating bar 342 opposite its pivotally supported end, engages valve cross-pin 346 for imparting a longitudinal sliding motion to a neutral control valve 350.

An automatically operable pump oil supply unit 352, including a facility for priming pump 302 with oil during initial operations of the pump, as well as a facility for providing a continuous source of oil supply for pump 302 following the priming operation, is fastened to valve housing 330 by means of bolts 354 and 356.

Valve housing 330 has an end portion thereof internally bored to receive a valve seat 360, which is shown flanged at its outer end for being fixedly retained to valve housing 330 by means of one or more screws 362. The valve seat is provided with preferably a plurality of fluid-flow control ports 364 which communicate with an after-pressure discharge grove $G^1$ provided within the wall of valve housing 330, the purpose of which will be hereafter described.

The longitudinally central portion of valve housing 330 has a flanged spring retainer 366 mounted therein and assembled in fixed relation to the valve housing by means of lock-pins 368. One or more fluid escape passages 370 are provided through the cylindrical wall of valve housing 330, shown adjacent spring retainer 366, to avoid restriction of fluid flow out of the immediate area as will be hereafter further described.

The valve housing's end portion opposite that which contains valve seat 360, is bored to receive neutral control valve 350. Valve 350 has an outer end fluid-sealing portion 380 and an intermediately located air-oil admixture controlling portion 382 which operates in conjunction with a valve housing oil suction groove $D^5$ and a valve housing fluid suction groove $B^4$ communicating with pump 302.

Valve 350 has an extended stem-like portion 390 having a central fluid passage 392 which has preferably a plurality of elongated, discharge groove communicating passages 394 through the wall of stem 390. Fluid passage 392 also has preferably a plurality of passages 396 which provide for flow of fluids out of the stem's inner passage 392.

A fluid flow control, speed selector sleeve 400, is sized for suitable fluid-sealing, longitudinal sliding fit within valve seat 360. The bore of speed selector sleeve 400 is machined for mounting to the outer end of the valve stem 390, there being an inwardly projecting flange at the outer end of sleeve 400 for abutment against the end of stem 390. A cap screw 402 is shown threaded into passage 392 as one means of securing sleeve 400 in fixed relationship with valve 350 and its stem 390.

Sleeve 400 is provided with a plurality of elongated fluid-flow control ports 410 which are in fixed registration with the passages 396 of valve stem 390. Ports 410 are formed to maintain appropriate registration with valve seat ports 364 during neutral and low power-transmitting operations of pump 302, providing for adequate air and air-oil admixture flow through these ports.

A cylindrical, automatically operable, fluid flow pressure responsive, fluid discharge control piston 420 surrounds valve stem 390, having end bores sized for appropriate fluid retaining, sliding fit upon stem 390. Piston 420 has a recessed inner passage 422 which provides for fluid flow around and along stem 390. Piston 420 has a major diameter inner end portion thereof which is sized for appropriate fluid-sealing sliding fit within valve housing 330. This major diameter portion of piston 420 is provided with a plurality of discharge control ports 424 having maximum area registration with a fluid discharge groove $C^4$ located within valve housing 330, during neutral operation, but this major diameter portion of piston 420 has sufficient body length adjacent the piston's control ports 424 to fully close fluid discharge groove $C^4$.

An intermediate portion of piston 420 is substantially reduced in diameter under that of the major diameter portion so as to form a pressure-responsive face for piston 420. This intermediate portion of piston 420 is provided with a flow pressure port 426 which may be sized to establish a desired rate of fluid transfer therethrough and into a compartment A formed by the pressure-responsive face of piston 420, the adjacent inside area of valve housing 330 and the inner end of valve seat 360, as shall be hereafter further described.

The end portion of piston 420 which is opposite that of the major diameter portion, is sized for suitable fluid sealing, sliding fit within valve seat 360, this portion of the piston which is within the valve seat being slightly smaller in diameter than the heretofore described intermediate portion so as to form a stop shoulder on piston 420 to abut against the inner end of valve seat 360.

A compression spring 430 is mounted around valve stem 390, having one end held stationary by the flanged spring retainer 366. The other end of the spring 430 is in contact with piston 420 for imparting a longitudinal thrust force thereon. Note if the spring 430 that is normally used is replaced by a spring having sufficient strength to maintain piston 420 against its stop despite pressures within chamber A, the assembly will have yielding-to-load characteristics instead of constant speed characteristics.

VII. OPERATION OF STATIONARY HOUSING APPARATUS

Referring particularly to FIGS. 27 and 33, the lower region of receptacle 304 is provided with a suitable fluid such as oil, to an operating level approximating the line designated X, substantially only air being in the unoccupied spaces within receptacle 304 above the line X.

1. Neutral operation, employing air only

Control valve assembly 322 being located in the upper air region within receptacle 304, the air-oil admixture controlling portion 382 of neutral control valve 350 (see FIG. 29), is shown positioned for neutral operation wherein oil entering the valve control area from oil suction groove $D^5$ is prevented from entering the fluid suction groove $B^4$ communicating with pump 302. Air has unimpeded access to groove $B^4$ for passage through pump 302, returning to the control valve assembly through the valve housing's fluid discharge groove $C^4$, thence through the elongated valve stem passages 394 and into the area containing spring 430 for escape into the upper region of receptacle 304 through the valve housing's fluid escape passages 370. Consequently, the unimpeded flow of air to, through and from pump 302 provides for its delivery of only residual (minimum) torque to output shaft 312.

2. Low constant output speed operation

Referring particularly to FIGS. 27, 30, and 33, it will now be noted that the air-oil admixture controlling portion 382 of valve 350 is positioned to just initially prevent air from entering the fluid suction groove $B^4$. During movement of valve 350 from the position shown in FIG. 29 to its position shown in FIG. 30, the complete transition of the nature of fluid being circulated by pump 302, from its minimum torque producing air circulation through the entire range of air-oil admixtures to that of circulation of only oil, accomplishes a smooth and uninterrupted buildup of torque being delivered by pump 302 to output shaft 312 to accompany its low output speed.

Only oil is now available to the suction groove $B^4$ from the pump's fluid region below the line X, entering pump oil supply unit 352 through its passage $D^1$, the heretofore mentioned pump priming facility of the oil supply unit 352 in association with an oil slinger 440 having initially provided oil suction groove $D^5$ with oil. The end sealing portion 380 and the portion 382 of valve 350 forms a manifolding together of oil suction groove $D^5$ and fluid suction groove $B^4$, only oil passing through pump 302 and returning to control valve assembly 322 through the valve housing's fluid discharge groove $C^4$.

It should now be noted that all of the torque producing pressures of pump 302 will be restricted to exist within the fluid discharge groove $C^4$, as accomplished by partial closing of this groove by the automatically operable discharge control piston 420, the torque producing pressures also existing upstream from groove $C^4$, within the valve housing flange's passage $C^3$ and other associated discharge passages leading to pump 302, including pump 302 itself.

It should be further noted that the fluid flow downstream from discharge groove $C^4$, passing through discharge control ports 424 of piston 420, enters internal fluid passage 392 through elongated valve stem ports 394 which are now located wholly within the recessed inner passage 422 of piston 420 due to movement of valve stem 390 by control lever 300 (see FIG. 30).

The downstream fluid flow continues through passage 392 and through passages 396 to enter elongated flow-control ports 410 of speed selector sleeve 400 which still register with valve seat flow-control ports 364. However, ports 410 and 364, which were of adequate area for substantially unimpeded flow therethrough of air-oil admixtures during the movement of valve stem's ports 394, relative to piston 420, toward becoming wholly within recessed inner passage 422, are now inadequate in size for unimpeded flow of only oil. A static fluid pressure is accordingly now being generated within the fluid passages 410, 396, 392, 394 and the piston's inner recessed passage 422.

The intermediate portion of piston 420 is provided with the static flow pressure port 426 for communicating inner recessed passage 422 with compartment A. It will be seen that the static pressure generated within passage 422 and likewise within compartment A is sufficient to have caused piston 420 to move to the left from its position shown in FIG. 29 to the position shown in FIG. 30. An impeding of the discharge groove $C^4$ (because control ports 424 are somewhat out of register therewith) may be assumed to have established a selected low speed for output shaft 312. Now will be considered the effects on that selected speed of load increases and decreases.

2a. Maintenance of selected low constant output speed during occurrence of torque load increases on output shaft 312

It will be understood by those acquainted with the art that different levels of torque loads imposed upon output shaft 312 by driven apparatus operatively connected thereto, causes like proportional changes in hydrostatic pressure within pump 302, in the discharge passages thereof and in downstream discharge passages leading to and including the valve housing's discharge groove $C^4$. However, the static fluid pressure within compartment A is related only to the rate of fluid flow being selectively premitted to pass through flow-control ports 410 and their associated flow-control ports 364. Consequently, an increase in torque loads imposed upon output shaft 312 will tend to increase the slip of pump 302 and likewise tend to increase the rate of fluid flow passing through ports 410 and 364.

Inasmuch that an increase in fluid flow results in a static pressure rise within compartment A, piston 420 is automatically moved to the left until its further closing of discharge groove $C^4$ causes pump 302 to again operate its output shaft 312 at the pre-selected speed, whereupon, the rate of fluid flow passing through flow-control ports 410 and 364 is again the same as it was prior to the occurrence of the torque load increase.

2b. Maintenance of selected low constant output speed during occurrence of torque load decreases on output shaft 312

A decrease in torque loads being imposed upon output shaft 312 will tend to increase its output speed, resulting in an inversely proportional decrease in the rate of fluid flow passing through ports 410 and 364. The drop in fluid flow results in a lowering of the static pressure within compartment A, until the longitudinal thrust force exerted by compression spring 430 upon piston 420 is greater than the thrust force on piston 420 created by the static pressure within compartment A. Piston 420 is automatically moved to the right until its discharge control ports 424 have opened discharge groove $C^4$ sufficiently to reestablish the speed which was pre-selected for output shaft 312, whereupon the rate of flow for the fluid passing through ports 410 and 364 is again the same as it was prior to the occurrence of the torque load decrease.

3. High constant output speed operation

Referring to FIG. 31, it will be seen that the manifolding together of oil suction groove $D^5$ and fluid suction groove $B^4$ is operatively the same as shown in FIG. 30, although neutral control valve 350 has been moved considerably further to the right from its position shown in FIG. 30. The speed selector sleeve's flow-control ports 410 have been positioned so as to permit only a small amount of oil to flow from the valve stem's internal passages 392 and 396 into the valve seat's flow-control ports 364, this flow restriction (which is termed in the claims as "closure means") generating a higher static pressure within the ports or passages 410, 396, 392, 394, 422, 426 and within compartment A. Higher pressure in compartment A has caused piston 420 to move considerably to the left from its position shown in FIG. 30, whereby its discharge control ports 424 (termed in the claims as "constricting means") permit only a small amount of oil to escape from discharge groove $C^4$ resulting in a selected high speed for output shaft 312.

3a. *Maintenance of selected high constant output speed during occurrence of torque load changes on output shaft 312*

All factors pertaining to the automatic movement of piston 420, to the left of its position shown in FIG. 31 to compensate for increased torque loads being imposed upon the output shaft 312, to the right of its position shown in FIG. 31 to compensate for decreased torque loads being imposed upon output shaft 312, is the same as has been heretofore described in 2a and 2b for maintenance of selected low constant output speeds.

4. *General variably selective constant output speed operations*

From the foregoing description of operation at selected low and high constant output speeds, including the manner in which such selected output speeds are maintained during changes in torque loads being imposed upon output shaft 312 by driven apparatus operatively connected thereto, it will be obvious that any desired constant output speed level can be selected and automatically maintained, within the limits of the minimum and maximum constant speed levels afforded by design. For each such constant output speed level so selected, the amount of fluid flowing to and from pump 302 and through its discharge control groove $C^4$, as permitted by the automatic positioning of piston 420, will be approximately the same as the amount of fluid flowing through the speed selector sleeve's flow-control ports 410 in their association with the valve seat's flow-control ports 364.

During all operations at output speeds less than that of full engagement, the various amounts of fluid flowing through the valve seat's flow-control ports 364, as related to the various selected speeds, will enter after-pressure discharge groove $G^1$ and a passage $G^2$ within receptacle web 306 for optional, partial or complete flow through a heat exchanger where needed (see FIG. 33). Through use of a compression spring having a load rating sufficient to require static fluid pressures within compartment A to be substantially above the working pressure which is necessary to effect the required fluid flow through a heat exchanger, the employment of the herein described control system provides the same character of fluid flow being available for passage through a heat exchanger as that existing for hydraulic apparatus of the type disclosed in my prior referenced Patent 3,144,923.

5. *Establishment of preferred automatic discharge control piston's rates of response to torque load changes*

Referring to FIGS. 29, 30 and 31, methods of establishing preferred operative response rates for the automatic discharge control piston 420 may be described by, but not necessarily limited to, the following:

5a. The diameter of that portion of the inner recess 422 which, for example, begins in-line with the pressure-responsive face of piston 420 that forms the left end of compartment A, and ends at least to the right of flow-pressure port 426, may be reduced relatively to the adjacent outside surface of valve stem 390 so as to retain adequate pressure transfer from the piston's inner recess 422 into compartment A, but desirably limit the rate of actual fluid transfer between the recess 422 and compartment A, including optional employment of a relatively tapered surface for such described areas of recess 422.

5b. The size of flow-pressure port 426 as well as its circumferential location relative to the location of the piston's discharge control ports 424 and to valve stem ports 394, may be determined so as to permit adequate pressure transfer into compartment A but limit the rate of actual fluid transfer into or out of compartment A.

5c. Either of the methods described in 5a and 5b, or combinations thereof, may be employed to obtain preferred response rates for the automatic discharge control piston as related to torque load changes imposed upon output shaft 312, due to the following:

The static pressure within compartment A is solely a result of, and related to, the pressure within the ports or passages 392, 394, 396, 426, and 422 as generated by selective fluid-flow regulation of valve seat ports 364 by speed selector sleeve 400. The thrust force to move piston 420 to the left or to the right depends solely upon the variations of static pressure within compartment A, resulting from fluid flow rate changes originating with pump 302 simultaneously with torque load changes varying the pump output speed, once a speed level has been obtained through positioning of sleeve 400. However, any movement of piston 420 results in a change in the total fluid volume contained within compartment A. Consequently, fluid must flow into, or out of compartment A by passing through port 426. The desired flow rate through this port can be established without adversely affecting its static pressure transfer capacity.

6. *Full engagement*

FIG. 32 illustrates speed selector sleeve 400 having been moved to completely close the valve seat's flow-control ports 364. A static pressure slightly greater than that required to obtain the high constant output speed operation, will be generated within compartment A to provide the positioning of piston 420 wherein its control ports 424 are only very slightly in communication with fluid discharge groove $C^4$ in valve housing 330. Such slight communication will only be of the magnitude wherewith just enough of the torque-created working pressure existing within groove $C^4$ will be tapped off into inner recess 422 to provide sufficient static pressure within compartment A to maintain the piston's control port 424 just short of having fully closed discharge groove $C^4$. If groove $C^4$ were to be fully closed, obviously the downstream fluid pressure would drop to zero.

Consequently, automatic discharge control piston 420 will be so positioned, during full engagement operations, as to be immediately ready to maintain any selected constant output shaft speed which is lower than the output speed obtained by full engagement.

The foregoing has described my invention in two embodiments, a rotary housing and a stationary housing type of hydraulic apparatus. The hydraulic apparatus may be described broadly as of a type having relatively moving gear, vane or other parts and having oil, or oil and air, employed with the relatively moving parts to effect power transmittal therebetween. The constant speed control system, broadly, operates to maintain speed transmitted from driving to driven shafts despite changes in load on the driven shaft at each control setting. This is accomplished by a member, such as a piston, responding to the quantity of fluid being circulated by the relatively moving parts and acting responsive to tendencies of said quantity to vary upon changes in load to correct that tendency by controlling the amount of fluid being circulated by the moving parts, which principle can be variously applied in different hydrostatic and hydrodynamic types of hydraulic apparatus.

I do not wish to be understood as limiting myself to the exact details shown and described but instead wish to cover those modifications thereof which will occur to those skilled in the art and which are properly within the scope of my invention, and of the appended claims.

I claim:

1. In hydraulic apparatus variably transmitting power from a rotary driving member to a rotary driven member by pump means having relatively moving parts connected to said two members, an oil source connected to said pump means, and discharge passageway means from said pump means, constant output speed control means, comprising:
   (a) said discharge passageway means having adjustable closure means operative to control flow to produce static pressure therein
   (b) constricting means operable to regulate passage of oil through said discharge passageway means
   (c) pressure responsive operating means acting automatically responsive to a certain level of static pressure to operate said constricting means to restrict said passage of oil, whereby a constant output speed effect is achieved at said level of pressure because static pressure is directly related to g.p.m. flow resulting from relative rotation between said rotary members and because any change in loads tending to change speed of said relative rotation results in change in static pressure causing said constricting means to restrict or open passage of oil to restore g.p.m. flow to its previous value
   (d) manually operable means acting on said closure means operable to vary the level of static pressure whereby said constant speed control means will act at various speeds depending on the setting of said closure means.

2. In hydraulic apparatus variably transmitting power from a rotary driving member to a rotary driven member by pump means having relatively moving parts connected to said two members, an oil source connected to said pump means, and discharge passageway means from said pump means, the degree of relative movement of said parts producing various levels of g.p.m. oil flow from said oil source and into said discharge passageway, constant speed control means, comprising:
   (a) constricting means operable to regulate passage of oil through said discharge passageway means
   (b) means operating said constricting means automatically responsive to flow above and below set levels of g.p.m. flow by opening said constricting means to permit less restricted flow responsive to reductions in g.p.m. flow and by closing said constricting means to achieve more restricted flow responsive to increases in g.p.m. flow thereby achieving a constant output speed effect at the set level of g.p.m. flow.
   (c) adjustable means establishing various set levels of g.p.m. flow in said means operating said constricting means thereby achieving constant speed effects at various levels of relative rotation between the pump parts.

3. In hydraulic apparatus variably transmitting power from a rotary driving member to a rotary driven member by pump means having relatively moving parts connected to said two members, an oil source, means admitting air and valve means variably admitting air and/or oil to said pump means for a speed and/or torque function, and discharge passageway means from said pump means, constant output speed control means, comprising:
   (a) said discharge passageway means having closure means operative to control flow to produce static pressure therein
   (b) constricting means operable to regulate passage of oil through said discharge passageway means
   (c) operating means acting automatically responsive to a certain level of static pressure to operate said constricting means to restrict said passage of oil, whereby a constant output speed effect is achieved at said level of pressure because static pressure is directly related to g.p.m. flow resulting from relative rotation between said rotary members and because any change in loads tending to change speed of said relative rotation results in change in static pressure causing said constricting means to restrict or open passing of oil to restore g.p.m. flow to its previous value.

4. The subject matter of claim 3 in which said constant speed control means includes remotely operable means acting on said closure means operable to vary the level of static pressure produced thereby, whereby said constant output speed control means will act at various speed depending on the setting of said closure means.

5. The subject matter of claim 4 in which said remotely operable means also operates said valve means whereby speed changes effected through said valve means are related to the settings of said constant output speed control means, and in which said remotely operable means has a full engagement position in which said closure means completely closes to prevent pump discharge thereby to maximize speed and/or torque delivered from said driving member to said driven member.

6. The subject matter of claim 3 in which there is a rotary housing enclosing said pump means and rotating with said driving member and said oil source is oil contained in said housing which forms an annulus of oil and outlet from said discharge passageway is directed radially outward from the axis of rotation of said driving and driven members into said annulus of oil, whereby during operation of the pump means with all air, by the setting of said valve means, discharged air will penetrate the oil annulus forming oil laden vapor to assist in lubricating relatively moving parts.

7. In hydraulic apparatus variably transmitting power from a rotary driving member to a rotary driven member by pump means having relatively moving parts connected to said two members, an oil source connected to said pump means and discharge passageway means from said pump means, constant speed control means, comprising:
   (a) said discharge passageway means having adjustable closure means operative to control flow to produce static pressure therein
   (b) constricting means operable to regulate passage of oil through said discharge passageway means
   (c) a pressure responsive member exposed to static pressure in said discharge passageway and movable responsive to said static pressure to operate said constricting means
   (d) means biasing said pressure responsive member in opposition to the force from said static pressure
   (e) whereby a constant speed effect is achieved at a certain level of static pressure when said means biasing said pressure responsive member is overcome, as said level of pressure is related directly to g.p.m. flow resulting from relative rotation between said rotary members and because any change in loads tending to change speed of said relative rotation results in change in static pressure causing said constricting means to restrict or open passage of oil to restore g.p.m. flow to its previous value.

8. In hydraulic apparatus variably transmitting power from a rotary driving member to a rotary driven member by pump means having relatively moving parts connected to said two members, an oil source, means admitting air, and valve means variably admitting air and/or oil to said pump means for a speed and/or torque control function, and discharge passageway means from said pump means, constant output speed control means, comprising:
   (a) a chamber connecting to said discharge passageway
   (b) closure means operable to control flow in said discharge passageway downstream from said chamber, whereby static pressure may be produced in said chamber (c) a piston exposed to static pressure in said chamber and movable thereby (d) spring means acting on said piston in opposition to said static pressure (e) constricting means for said discharge passageway upstream of said chamber operable to regulate passage of oil and movable by said piston (f) whereby a constant speed effect is achieved at a level of static pressure when said spring means is overcome, as said level of pressure is related directly to g.p.m. flow resulting from relative relation between said rotary members and because any change in loads tending to change speed of said relative rotation results in change in static pressure causing said piston to move and adjust the position of said constricting means to restrict or open passage of oil to restore g.p.m. flow to its previous value.

9. The subject matter of claim 8 in which said hydraulic apparatus is of a rotary housing type and said pump means has a manifold plate with a central hub outstanding axially of said pump means, said piston having an annular form and being slidable on said hub, an annular cylinder encircling said piston and said cylinder and piston having mating surfaces defining said chamber which has the shape of an annulus and which forms a part of said discharge passageway, said hub having as part of said discharge passageway an inlet opening to said chamber, said piston having an opening registering with said inlet opening in one position of said piston whereby said constricting means is provided by the relative positioning of said inlet opening and said opening in said piston.

10. The subject matter of claim 9 in which said closure means includes a sleeve encircling said cylinder having an opening movable into and out of registry with an outlet opening in said cylinder from said chamber thereby adjustably regulating flow in said discharge passageway, remotely operable means for moving said sleeve which is also connected to said valve means, whereby said constant speed control means is related to the speed and/or torque control by said valve means and constant speed may be effected at various settings of said valve means.

11. The subject matter of claim 10 in which said sleeve is movable by said remotely operable means to a full engagement position wherein the opening in said sleeve and said outlet opening are completely out of registry, whereby pump discharge is blocked to maximize speed and/or torque delivered from said driving member to said driven member, said inlet opening and said opening in said piston in said full engagement position of said sleeve being in registry sufficiently to maintain pressure in said chamber whereby upon movement of said sleeve out of full engagement position said piston is biased by static pressure in position to assume normal action in constant speed control.

12. The subject matter of claim 10 in which there is a guide element having a cylindrical portion of substantial length slidable within said hub and having an annular flange connected to said sleeve whereby said guide element guidably supports said sleeve and stabilizes said sleeve, cylinder and piston relative to said hub.

13. The subject matter of claim 10 in which there are adjustable stops connected to said sleeve and limiting the travel of said piston relative to said sleeve whereby said piston can be adjusted to not completely respond to levels of static pressure in some settings of said sleeve by said remotely operable means and still can achieve its constant speed control function in other settings of said sleeve.

14. In hydraulic apparatus variably transmitting power from a rotary driving member to a rotary driven member by pump means having relatively moving parts connected to said two members, an oil source connected to said pump means, and discharge passageway means from said pump means, constant output speed control means comprising:

(a) spool valve means having a valve cylinder and a movable valve piece, said valve piece having a valve passageway forming a part of said discharge passageway, said valve cylinder and piece having registrable inlet and outlet port means (b) said valve piece being slidable moving said outlet ports away from full registry thereby controlling outlet and producing static pressure in said valve passageway (c) a cul de sac chamber connected to said valve passageway and a piston exposed to static pressure in said chamber and movable thereby (d) spring means acting on said piston in opposition to said static pressure (e) constricting means for one of said port means operable to regulate passage of oil and movable by said piston (f) whereby a constant speed effect is achieved at a level of static pressure when said spring means is overcome, as said level of pressure is related directly to g.p.m. flow resulting from relative rotation between said rotary members and because any change in loads tending to change speed of said relative rotation results in change in static pressure causing said piston to move and adjust the position of said constricting means to restrict or open passage of oil to restore g.p.m. flow to its previous value.

15. The subject matter of claim 14 in which there are remotely operable means for moving said valve piece and movement of said valve piece in one part of the travel thereof variably adjusting the registry of said outlet port means thereby varying the level of static pressure created in said valve passageway whereby said constant speed control means will act at various speeds depending on the setting of said valve piece by said remotely operable means.

16. In stationary housing hydraulic apparatus variably transmitting power from a rotary driving member to a rotary driven member by pump means having relatively moving parts connected to said two members, an oil source, means admitting air, and valve means variably admitting air and/or oil to said pump means for a speed and/or torque control function, and discharge passageway means from said pump means, constant output speed control means comprising:

(a) a valve cylinder and a valve spool slidable therein, said spool having a hollow portion forming a valve passageway and forming a part of said discharge passageway and having inlet and outlet port means connecting to opposite end portions of said valve passageway (b) said valve cylinder having inlet and outlet port means registrable with said valve passageway inlet and outlet port means and said spool being movable to a position moving said outlet port means out of full registry thereby controlling outlet and producing static pressure in said valve passageway (c) a separate chamber connected to said valve passageway and a piston exposed to static pressure in said chamber and movable thereby (d) spring means acting on said piston in opposition to said static pressure (e) constricting means for said inlet port means operable to regulate passage of oil and movable by said piston (f) whereby a constant speed effect is achieved at a level of static pressure when said spring means is overcome, as said level of pressure is related directly to g.p.m. flow resulting from relative rotation between said rotary members and because any change in loads tending to change speed of said relative rotation results in change in static pressure causing said piston to move and adjust the position of said constricting means to restrict or open passage of oil to restore g.p.m. flow to its previous value.

17. The subject matter of claim 16 in which said piston is annular and said piston being interposed between said spool and said cylinder, said chamber being annular and being partly formed by walls of said piston and cylinder, said piston having an opening connecting between said chamber and said valve passageway, said constricting means being formed by said piston having port means therethrough interposed between the inlet port means of said cylinder and valve and moving into and out of registry with said cylinder inlet port means to form said constricting means.

18. The subject matter of claim 16 in which said valve means is formed by a portion of said spool and by ported cylinder means therefor, whereby movement of said spool controls both said valve means and said constant speed control means, remotely operable means for moving said spool, movement of said spool in one part of the travel thereof variably adjusting the registry of said outlet port means thereby varying the level of static pressure created in said valve passageway whereby said constant speed control means will act at various speeds depending on the setting of said spool by said remotely operable means.

19. The subject matter of claim 16 in which there are remotely operable means for moving said spool and movement of said spool in one part of the travel thereof variably adjusting the registry of said outlet port means thereby varying the level of static pressure created in said valve passageway whereby said constant speed control means will act at various speeds depending on the setting of said spool by said remotely operable means, said remotely operable means having a fully engaged position in which said outlet port means are completely out of registry to prevent pump discharge thereby to maximize speed and/or torque delivered by said driving member to said driven member.

20. In hydraulic apparatus employing fluids and transmitting torque from a rotary driving member to a rotary driven member at selective levels of speed which are effected by control means varying the quantity of fluid being circulated in fluid passageways between driving and driven means, constant speed control means maintaining the selected speed being transmitted from said driving member to said driven member, comprising:
(a) a chamber connected to said fluid passageways and having variable fluid outlet closure means subject to selective regulation corresponding to the setting of said control means to produce levels of static pressure within said chamber
(b) a part exposed to said static pressure in said chamber and movable thereby
(c) force means acting on said part in opposition to the force of said static pressuer acting on said part
(d) means regulating the quantity of fluid circulated in said fluid passageways and connected to and adjusted responsive to movement of said part, whereby a constant output speed effect is achieved because the level of static pressure in said chamber varies as quantities of fluid being circulated in said fluid passageways varies and because any change in torque tending to change speed of relative rotation between said rotary driving and driven members results in changes in static pressure moving said part and in turn adjusting said regulating means to increase or decrease fluid being circulated to restore the same to its level before imposition of change in torque.

21. In hydraulic apparatus employing fluids and transmitting torque from a rotary driving member to a rotary driven member at selective levels of speed which are effected by control means varying the quantity of fluid being circulated in fluid passageways between driving and driven means, constant speed control means maintaining the selected speed being transmitted from said driving member to said driven member, comprising:
(a) pressure sensitive means sensitive to static pressures in said fluid passageways and giving a control action responsive to variation in pressure above and below levels selected in said pressure sensitive means by said control means, and
(b) means regulating the quantity of fluid circulated in said fluid passageways and connected to and adjusted responsive to control action from said pressure sensitive means, whereby a constant output speed effect is achieved because the level of static pressure in said passageways varies as quantities of fluid being circulated varies and because any change in torque tending to change speed of relative rotation between said rotary driving and driven members results in changes in static pressure thereby acting on said pressure sensitive means and in turn adjusting said regulating means to increase or decrease fluid being circulated to restore the same to its level before imposition of change in torque.

References Cited by the Examiner
UNITED STATES PATENTS

| | | | |
|---|---|---|---|
| 1,935,400 | 11/1933 | Junkers | 192—61 |
| 2,329,230 | 9/1943 | Thomas | 192—61 |
| 3,144,923 | 8/1964 | Thomas | 192—61 |

DAVID J. WILLIAMOWSKY, *Primary Examiner.*

A. T. McKEON, *Assistant Examiner.*